United States Patent
Hu et al.

(10) Patent No.: US 11,711,006 B2
(45) Date of Patent: Jul. 25, 2023

(54) DRIVING MECHANISM

(71) Applicant: TDK TAIWAN CORP., Taoyuan (TW)

(72) Inventors: Chao-Chang Hu, Taoyuan (TW);
Chen-Hsien Fan, Taoyuan (TW);
Yueh-Lin Lee, Taoyuan (TW);
Yu-Chiao Lo, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 375 days.

(21) Appl. No.: 16/892,726

(22) Filed: Jun. 4, 2020

(65) Prior Publication Data
US 2021/0036593 A1   Feb. 4, 2021

Related U.S. Application Data

(60) Provisional application No. 62/882,165, filed on Aug. 2, 2019.

(30) Foreign Application Priority Data

Feb. 3, 2020   (CN) .......................... 202020150597.9

(51) Int. Cl.
| | |
|---|---|
| *H02K 41/035* | (2006.01) |
| *H02K 11/215* | (2016.01) |
| *H02K 41/03* | (2006.01) |
| *H02N 2/04* | (2006.01) |
| *H02N 2/06* | (2006.01) |
| *G02B 27/64* | (2006.01) |
| *H04N 23/68* | (2023.01) |
| *G02B 7/04* | (2021.01) |

(52) U.S. Cl.
CPC ......... *H02K 41/0356* (2013.01); *G02B 27/64* (2013.01); *H02K 11/215* (2016.01); *H02N 2/043* (2013.01); *H02N 2/062* (2013.01); *H04N 23/68* (2023.01); *G02B 7/04* (2013.01); *G02B 27/646* (2013.01)

(58) Field of Classification Search
CPC . H02K 41/0356; H02K 41/0354; H02K 41/31
USPC ...................................................... 310/12.16
See application file for complete search history.

(56) References Cited

U.S. PATENT DOCUMENTS

| 9,933,629 B2 * | 4/2018 | Minamisawa ....... H04N 5/2254 |
| 2019/0235267 A1 * | 8/2019 | Minamisawa ........... G02B 7/08 |

FOREIGN PATENT DOCUMENTS

| JP | 2013083692 A | * | 5/2013 | ............. G02B 27/64 |
| JP | 2015072388 A | * | 4/2015 | |
| JP | 6412864 B2 | * | 10/2018 | ........... G02B 27/646 |
| WO | WO-2019221021 A1 | * | 11/2019 | ............. G02B 27/64 |

* cited by examiner

*Primary Examiner* — Jose A Gonzalez Quinones

(74) *Attorney, Agent, or Firm* — Muncy, Geissler, Olds & Lowe, P.C.

(57) ABSTRACT

A driving mechanism is provided, including a fixed portion, a movable portion, a driving assembly and a connecting element. The movable portion may move relative to the fixed portion and is used for holding an optical module. The driving assembly moves the movable portion relative to the fixed portion. The connecting element is movably connected to the fixed portion and the movable portion.

20 Claims, 27 Drawing Sheets

DRIVING MECHANISM

CROSS REFERENCE TO RELATED APPLICATIONS

This application claims the benefit of U.S. Provisional Application No. 62/882,165, filed on Aug. 2, 2019 and China Patent Application No. 202020150597.9, filed on Feb. 3, 2020, which are incorporated by reference herein in their entirety.

BACKGROUND OF THE INVENTION

Field of the Invention

The present disclosure relates to a driving mechanism, and especially relates to an optical element driving mechanism.

Description of the Related Art

As technology has developed, it has become more common to include image capturing or recording functions into many types of modern electronic devices, such as smart phones and digital cameras. These electronic devices are used more and more often, and new models have been developed that are convenient, thin, and lightweight, offering more choices for consumers. Electronic devices that have image capturing or recording functions normally include a driving mechanism to drive an optical element (e.g. a lens) to move along its optical axis, thereby achieving auto focus (AF) or optical image stabilization (OIS). Light may pass through the optical element and may form an image on an optical sensor.

The optical element may be driven by the mechanism in the optical module, or may be driven by an additional driving mechanism. Current driving mechanisms usually use a spring to suspend the optical module in the driving mechanism. However, if the spring is too hard to bend, the spring may fracture, reducing its reliability. If the spring is too easy to bend, the force provided by the spring may not be enough, so the optical module may sink due to its own weight. As a result, errors may occur when detecting the position of the optical element.

BRIEF SUMMARY OF INVENTION

A driving mechanism is provided, including a fixed portion, a movable portion, a driving assembly and a connecting element. The movable portion may move relative to the fixed portion and is used for holding an optical module. The driving assembly moves the movable portion relative to the fixed portion. The connecting element is movably connected to the fixed portion and the movable portion.

In some embodiments, the connecting element includes a pair of connecting portions directly and movably connected to either the movable portion or the fixed portion. In some embodiments, the connecting element further includes another pair of connecting portions directly and movably connected to the other of the movable portion or the fixed portion. In some embodiments, the movable portion includes a holder, and the holder includes a contact element contacting one of the connecting portions. In some embodiments, the contact element includes two contact portions, and one of the connecting portions is positioned between the contact portions.

In some embodiments, each of the contact portions further includes an assembly portion, and the connecting portion is partially positioned in the assembly portion. In some embodiments, a portion of the assembly portion that contacts the contact portion is not a right angle. In some embodiments, the connecting portion overlaps one of the contact portions when viewed along the optical axis. In some embodiments, the driving mechanism further includes a strengthening element that is fit tightly to the contact portions to apply a force to the contact portions, and the direction of force is from the contact portions to the connecting portion.

In some embodiments, the fixed portion includes a base, the movable portion includes a holder, and the holder is disposed between the base and the optical module. In some embodiments, the fixed portion includes a base, the movable portion includes a holder, and the optical module is disposed between the holder and the base. In some embodiments, the fixed portion includes a frame surrounding the movable portion, and the optical module does not overlap the frame when viewed along the optical axis. In some embodiments, the fixed portion includes a base, the base includes a stopping portion extending to the movable portion, and the optical axis passes the center of the stopping portion.

In some embodiments, no magnet is positioned between the optical module and the fixed portion. In some embodiments, the optical module further includes a sensor, the optical module is substantially rectangular, and the driving assembly and the sensor are positioned at different sides of the optical module. In some embodiments, the optical module further includes a sensor, the optical module is substantially rectangular, and the driving assembly and the sensor are positioned on the same side of the optical module. In some embodiments, the driving mechanism further includes a circuit board, the optical module further includes a substrate, and the substrate and the circuit board do not overlap each other when viewed along the optical axis. In some embodiments, the connecting element has an opening, and the optical module further includes a circuit board partially disposed in the opening when viewed along the optical axis. In some embodiments, the connecting element includes a pair of first connecting portions directly connected to either the movable portion or the fixed portion, and a pair of second connecting portions directly connected to the other of the movable portion or the fixed portion, wherein a connection line of the pair of first connecting portions is perpendicular to a connection line of the pair of second connecting portions.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF INVENTION

Figure 1:
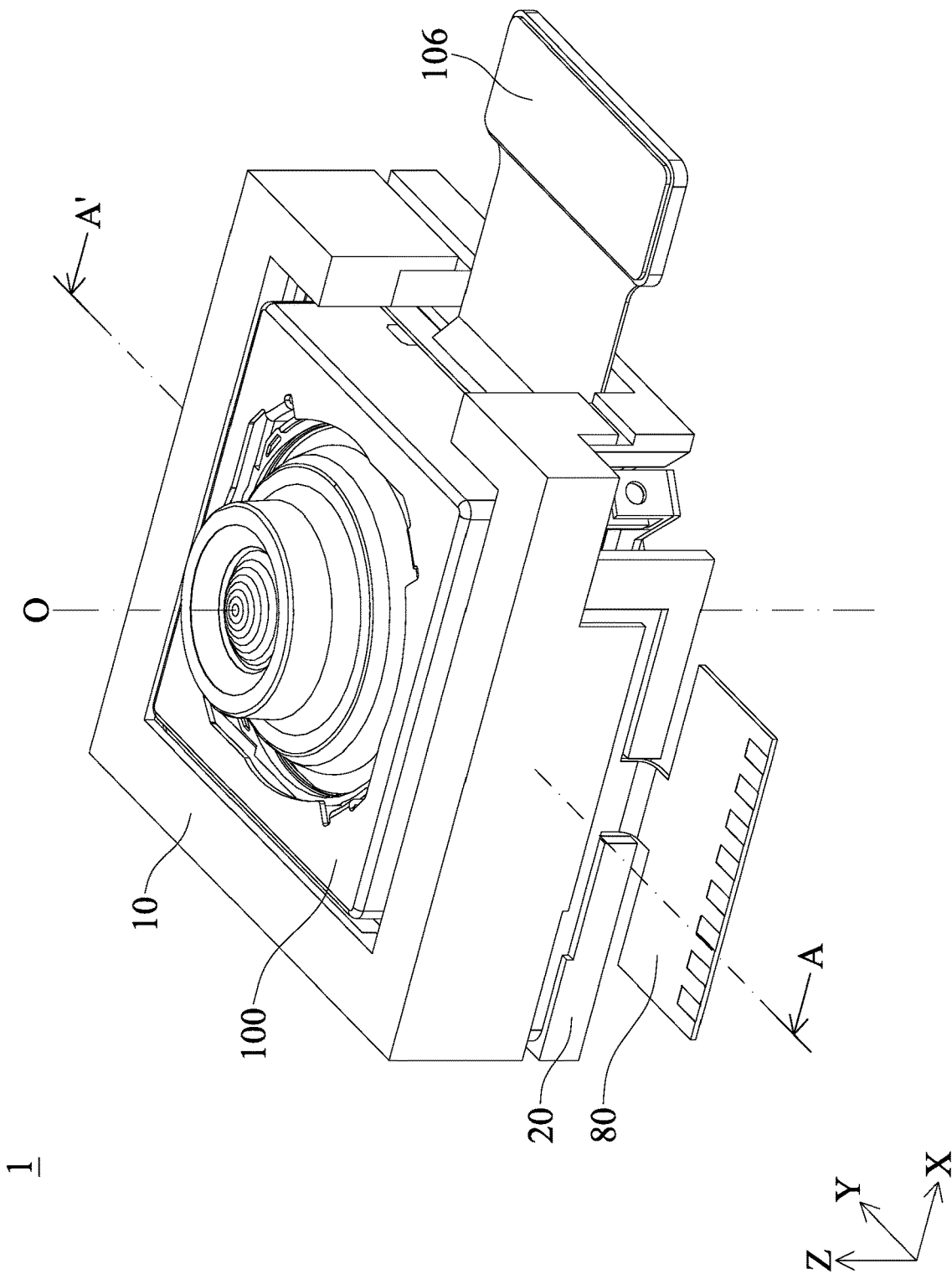
FIG. 1 is a perspective view of a driving mechanism in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Figure 2:
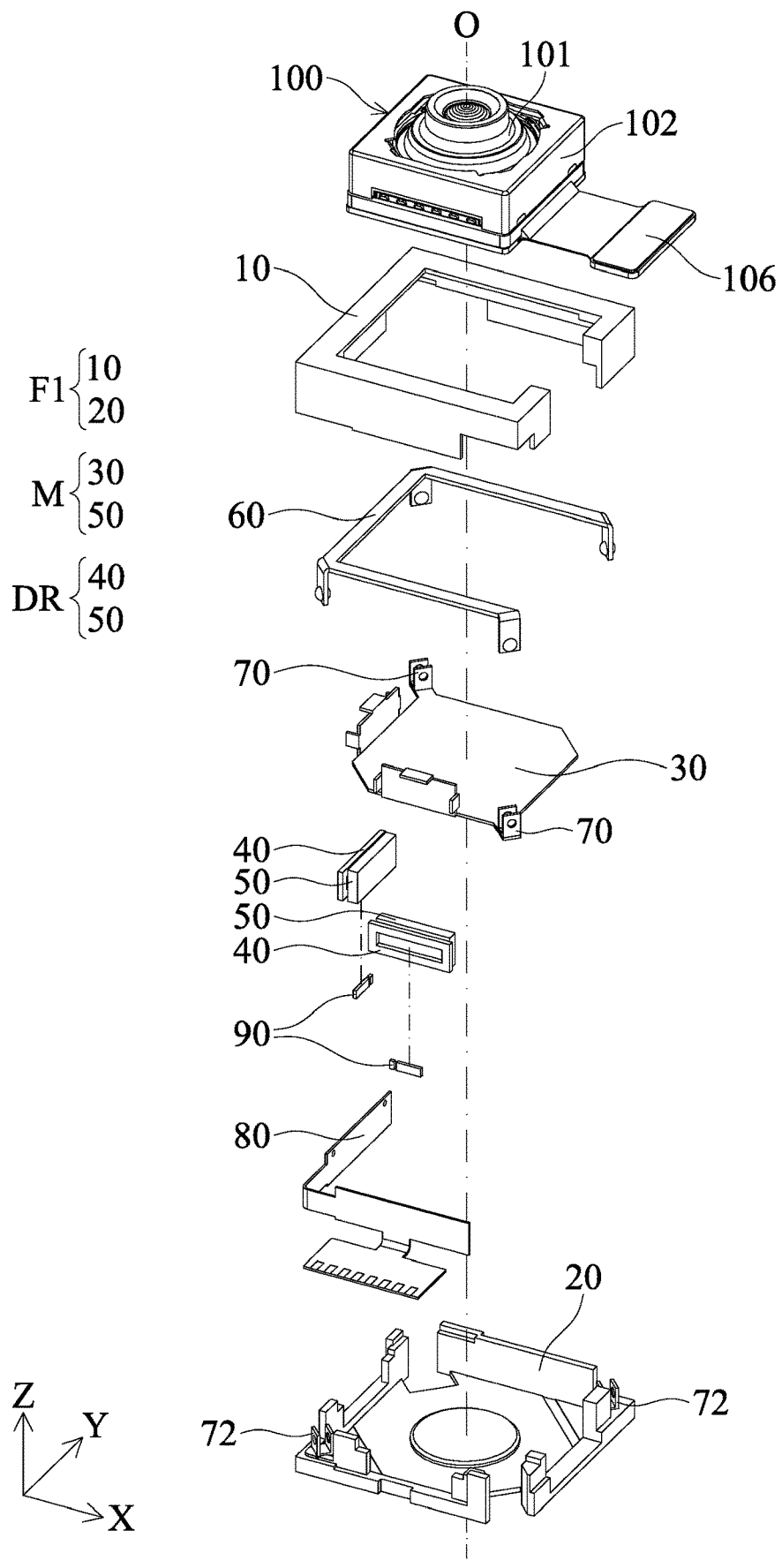
FIG. 2 is an exploded view of some embodiments of the present disclosure.
Figure 3:
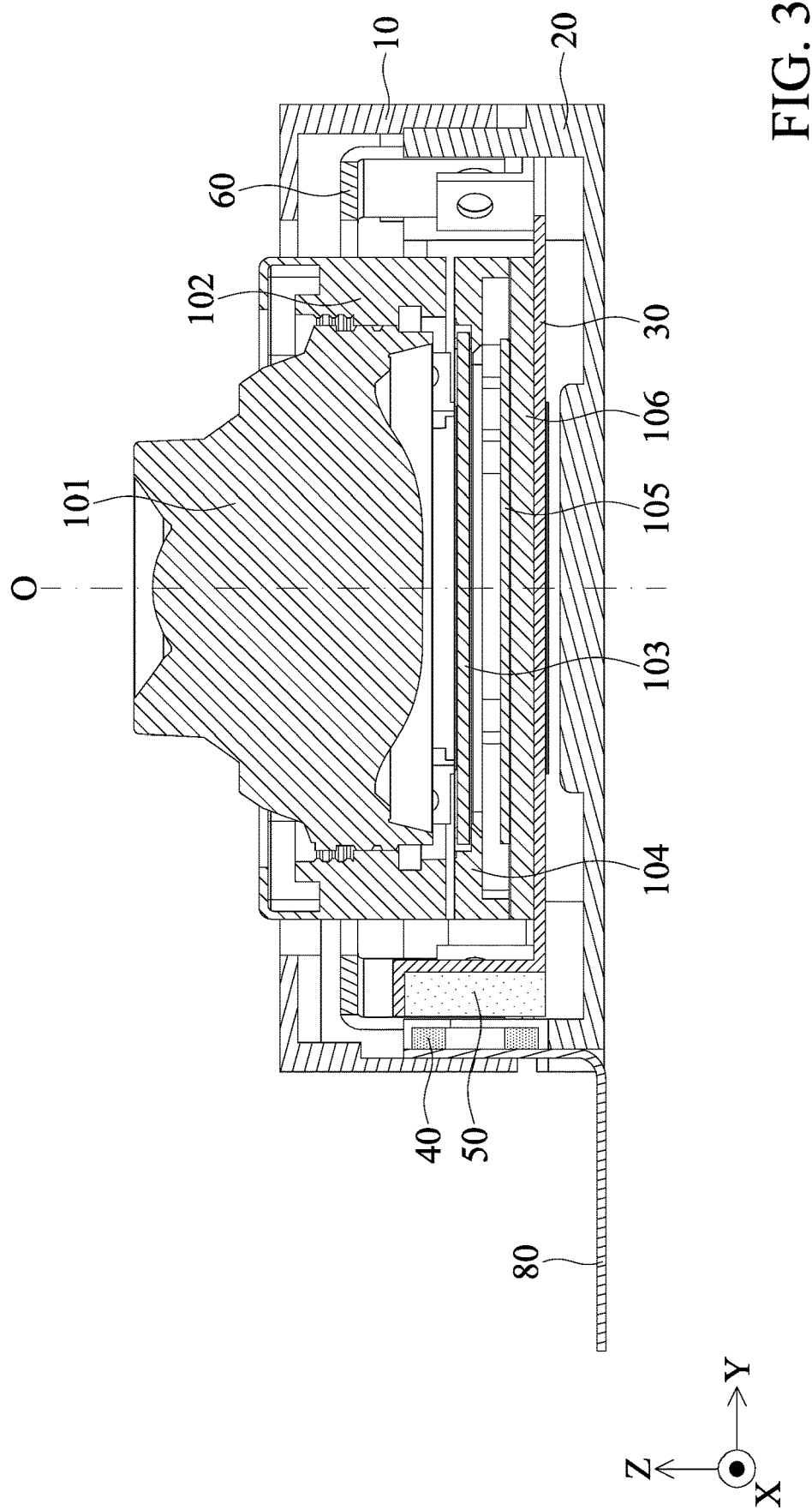
FIG. 3 is a cross-sectional view illustrated along line A-A' in FIG. 1.

First, please refer to FIGS. 1 to 3, which are a perspective view and an exploded view of a driving mechanism 1, and a cross-sectional view illustrated along the line A-A' in FIG. 1, in some embodiments of the present disclosure. The driving mechanism 1 mainly includes a frame 10, a base 20, a holder 30, a driving assembly DR (includes a first magnetic element 40 and a second magnetic element 50), a connecting element 60, a contact element 70, a contact element 72, a circuit board 80, and a position sensor 90. The driving mechanism 1 may drive the optical module 100 to move (such as rotate relative to a single axis or multiple axes) to achieve optical compensation.

The frame 10 and the base 20 may be combined to form a case of the optical module 100. The optical module 100 may be, for example, an optical module having auto focus (AF) or optical image stabilization (OIS) function. The optical module 100 may be disposed on the holder 30, such as affixed on the holder 30, and the optical module 100 may be moved with the holder 30 relative to the frame 10 and the base 20.

The first magnetic element 40 and the second magnetic element 50 may be, for example, a driving coil and a driving magnet, respectively. In some embodiments, the second magnetic element 50 may be a multipolar magnet, which includes two magnets with opposite magnetic poles. In such embodiments, the first magnetic element 40 may has a shape like capsule and may be disposed on the base 20 to correspond to the second magnetic element 50. However, the present disclosure is not limited thereto. For example, in some embodiments, the first magnetic element 40 may be a driving magnet, and the second magnetic element 50 may be a driving coil.

In this embodiment, the holder 30 and the optical module 100 disposed therein are movably disposed in the frame 10. More specifically, the holder 30 may be connected to the base 20 and being suspended in the frame 10 and the base 20 through the connecting element 60 (FIG. 3), and the holder 30 is disposed between the base 20 and the optical module 100. It should be noted that when current is passed through the first magnetic element 40, the first magnetic element 40 will interact with the magnetic field of the second magnetic element 50 to generate an electromagnetic force to move the holder 30 and the optical module 100 relative to the frame 10 and the base 20 to achieve optical compensation. As a result, the frame 10 and the base 20 may be called as a fixed portion F1, and the holder 30 and the second magnetic element 50 may be called as a movable portion M. The movable portion M is surrounded by the frame 10, and the optical module 100 does not overlap the frame 10 when viewed along the optical axis O.

It should be noted that a pair of contact elements 70 and a pair of contact elements 72 are positioned on the base 20 and the holder 30, respectively. The contact elements 70 may be positioned at the diagonal of the base 20, and the contact elements 72 may be positioned at the diagonal of the holder 30. In some embodiments, the base 20 and the contact element 70 may be disposed separately or formed integrally, and the holder 30 and the contact element 72 may be disposed separately or formed integrally.

In some embodiments, the circuit board 80 may be disposed on the base 20 and electrically connected to other electronic elements inside or outside the driving mechanism 1 to control the movement of the driving mechanism 1. Electronic signal may be transferred through the circuit board 80 to the first magnetic element 40 to control the movement of the holder 30 in X, Y or Z directions. In some embodiments, an additional reinforce structure (such a reinforce plate) may be disposed on the circuit board 80 to strengthen the circuit board 80.

The sensor 90 may be disposed on the fixed portion F1 and corresponding to the second magnetic element 50 to gain the rotate angle of the optical module 100 by detecting the position of the second magnetic element 50. In other words, the optical module 100 has a substantially rectangular shape, and the driving assembly DR and the sensor 90 are positioned on the same side of the optical module 100. The sensor 90 may be any suitable sensor, such as a Hall sensor, a magnetoresistance effect sensor (MR sensor), a giant magnetoresistance effect sensor (GMR Sensor), a tunneling magnetoresistance effect sensor (TMR Sensor), or a fluxgate sensor, but is not limited thereto.

Figure 4:
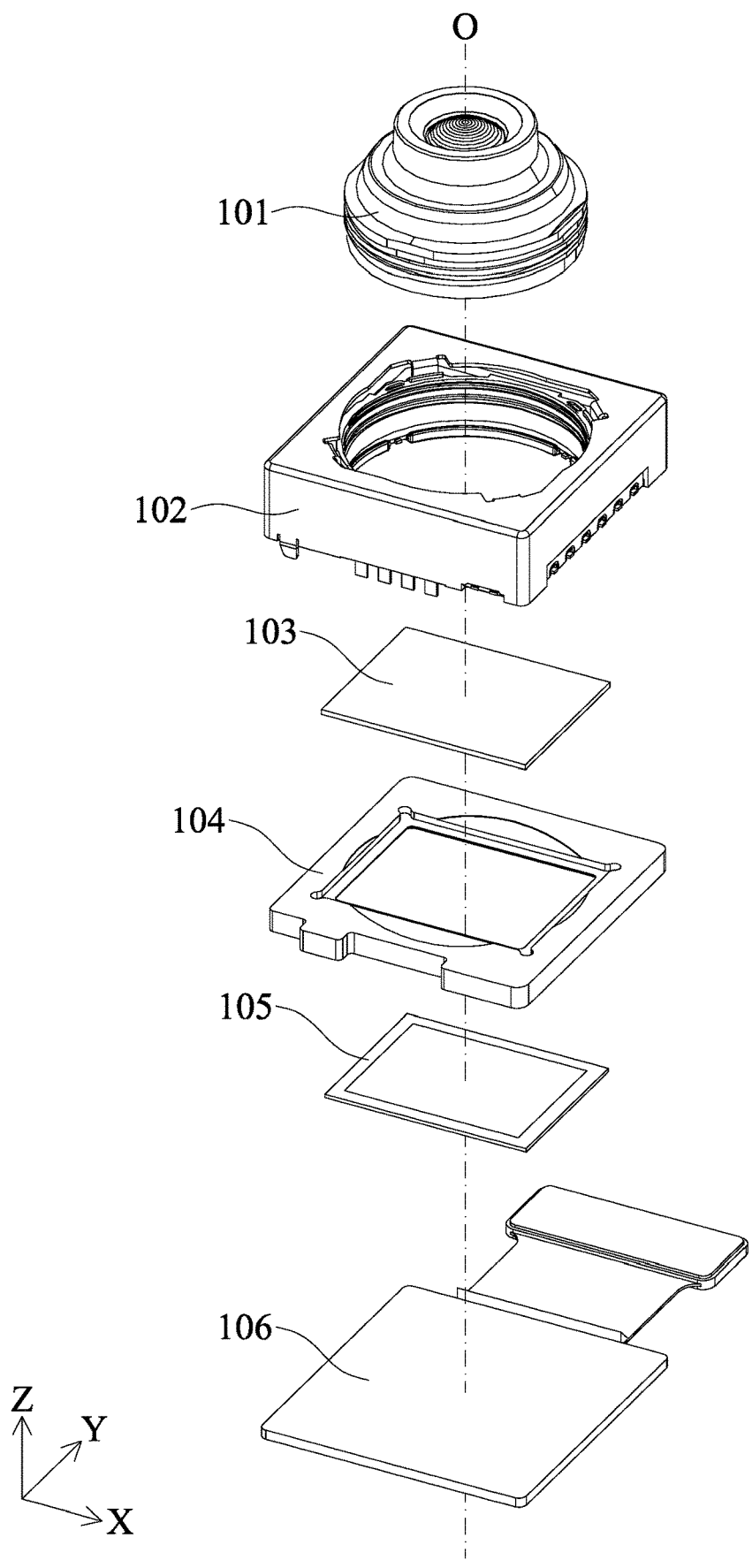
FIG. 4 is an exploded view of an optical module in some embodiments of the present disclosure.

FIG. 4 is an exploded view of the optical module 100. The optical module 100 may drive an optical element 101, and the optical module 100 further includes a driving assembly 102, a filter 103, a holder 104, an optical sensor 105, and a substrate 106 arranged along the optical axis O.

The optical element 101 may be disposed in the driving assembly 102, and the driving assembly 102 may include driving magnets and driving coils (not shown) to allow the optical element 101 to be driven by the driving assembly 102, so auto focus (AF) or optical image stabilization (OIS) may be achieved. The filter 103 may be disposed on the holder 104 and disposed between the optical element 101 and the optical sensor 105 to only allow a portion of the light to pass through the optical element 101 (such as light with a specific wavelength range) to reach the optical sensor 105, and the rest of the light is filtered. The substrate 106 may allow the elements in the optical module 100 to be electrically connected to other external elements.

In some embodiments, the optical module 100 further includes a sensor (not shown) to detect the movement of the optical element 101, wherein the optical module 100 has a substantially rectangular shape, and the driving assembly DR and the sensor are disposed at different sides of the optical module 100. As a result, magnetic interference between the driving assembly DR and the optical module 100 may be prevented.

Figure 5:
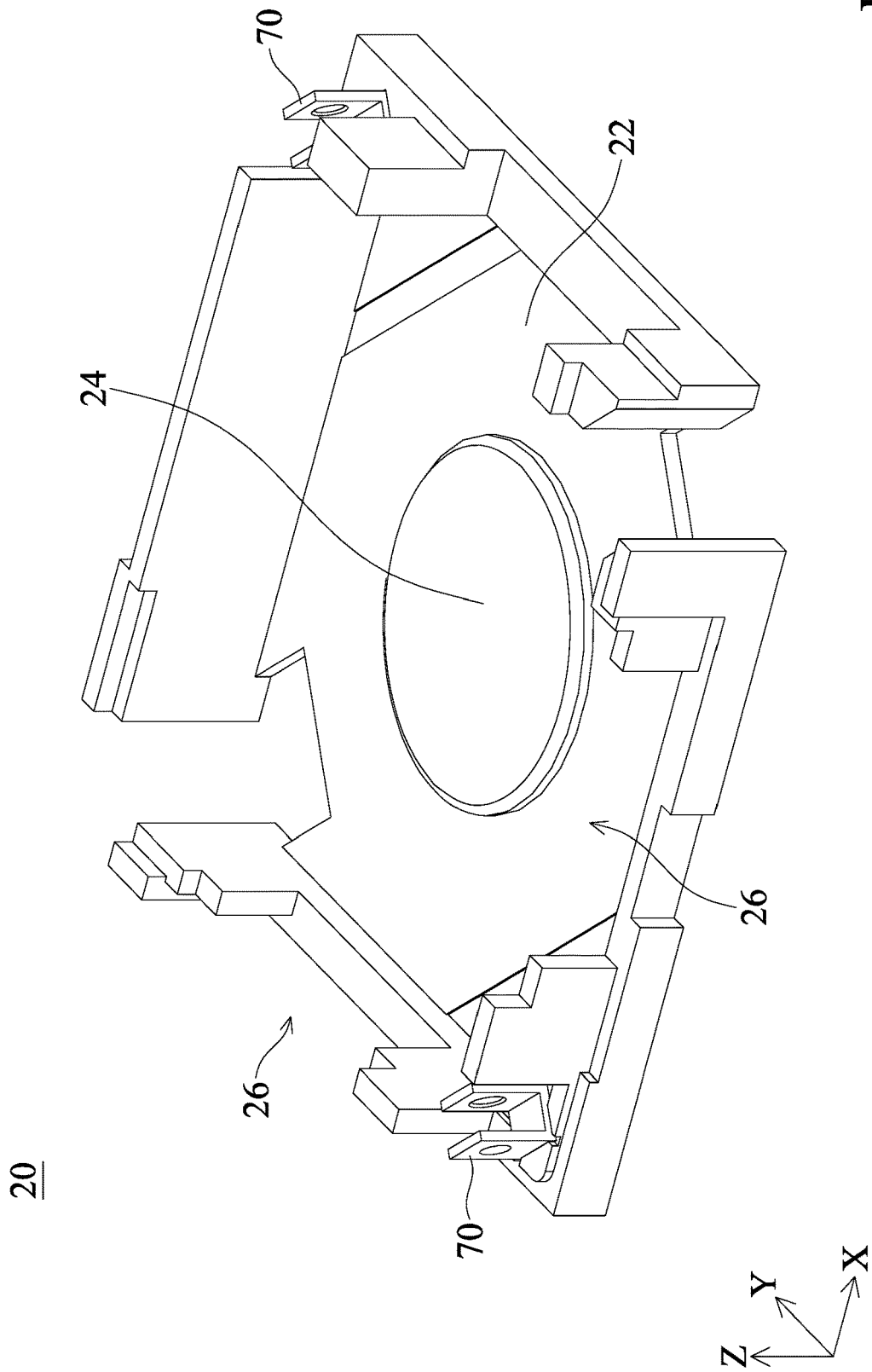
FIG. 5 is a schematic view of the base in some embodiments of the present disclosure.

FIG. 5 is a schematic view of the base 20. The base 20 may include a main body 22, a stopping portion 24 disposed at the center of the main body 22, and recesses 26 positioned on the sides of the main body 22. The stopping portion 24 may be circular to limit the moving range of the optical module 100 that is disposed on the base 20 in every direction. The first magnetic element 40 and the second magnetic element 50 may be disposed in the recesses 26 to prevent interference. Furthermore, the contact element 70 may be disposed at the corners of the base 20, such as affixed on the base 20 or formed integrally with the base 20.

Figure 6:
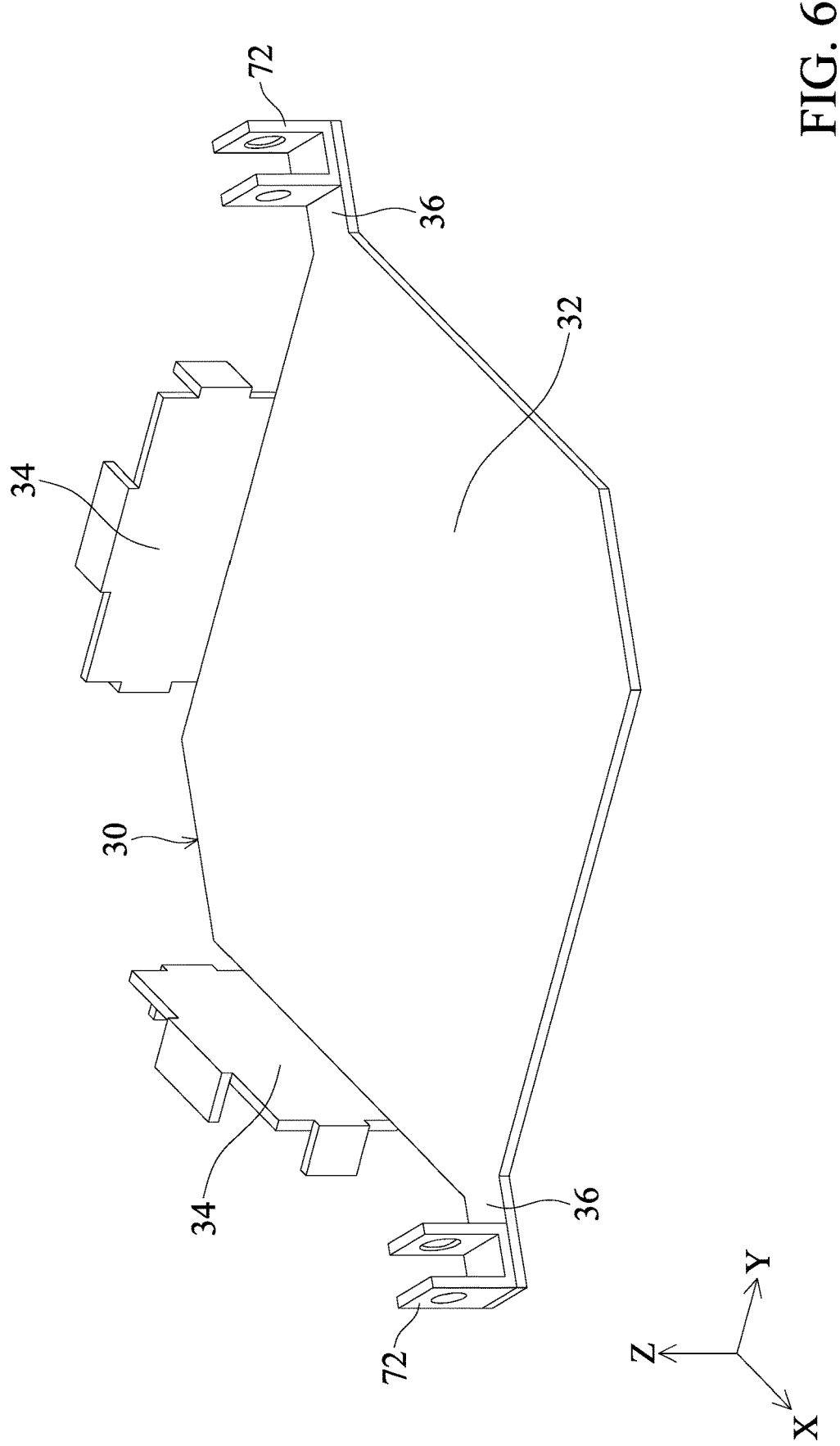
FIG. 6 is a schematic view of the holder in some embodiments of the present disclosure.

FIG. 6 is a schematic view of the holder 30. The holder 30 may include a main body 32, side plates 34 that are disposed on the sides of the main body 32 and extend from the main body 32, and extending portions 36 disposed at the corners of the main body 32. In some embodiments, two side plates 34 may be disposed on adjacent sides of the main body 32 for accommodating the second magnetic elements 50, such as affixed the second magnetic elements 50 on the side plates 34. The extending portions 36 may position at opposite corners of the main body 32, and the contact elements 72 may be disposed on the extending portions 36, such as affixed on the extending portions 36 or formed integrally with the extending portions 36.

Figure 7:
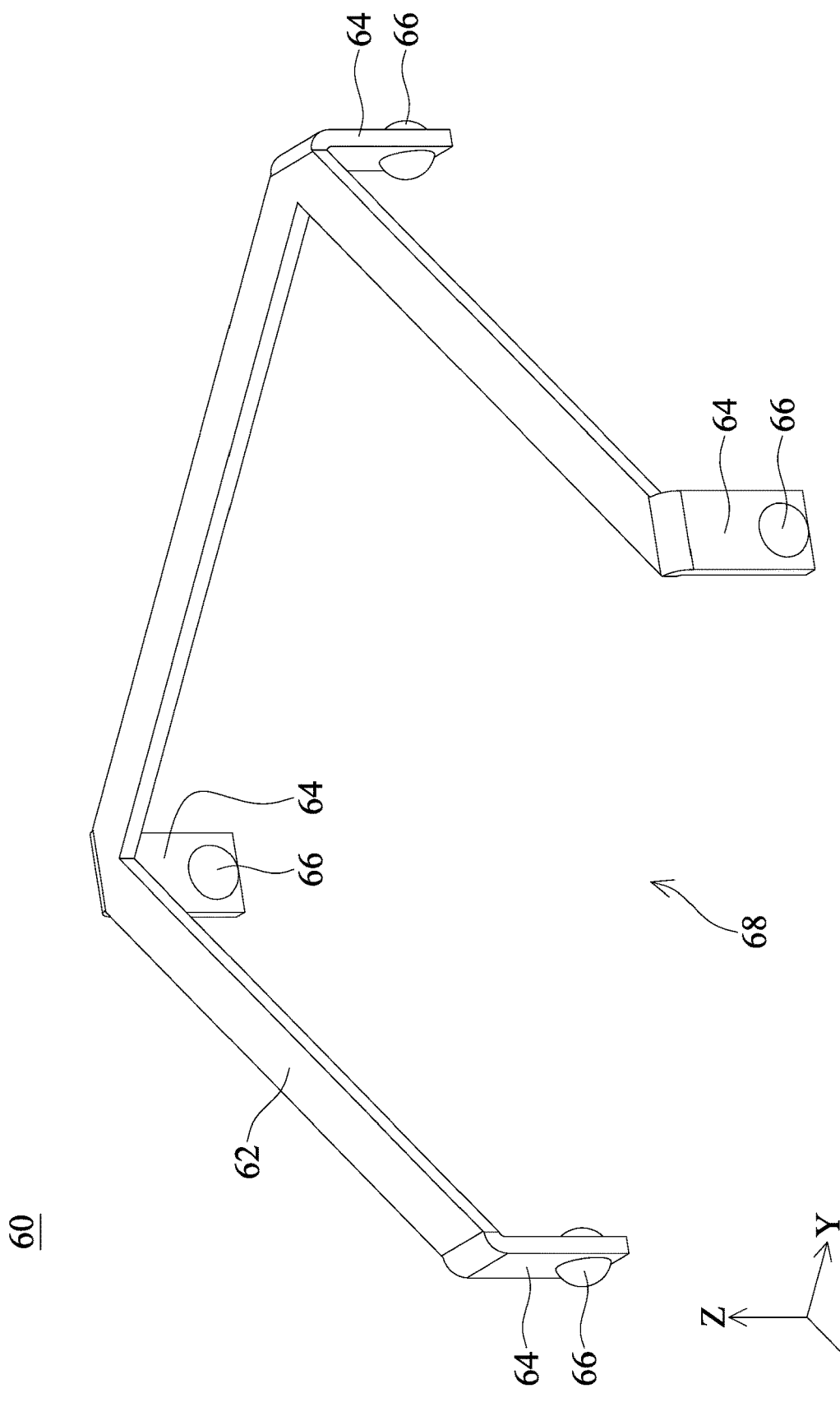
FIG. 7 is a schematic view of the connecting element in some embodiments of the present disclosure.

FIG. 7 is a schematic view of the connecting element 60. The connecting element 60 includes a main body 62, extend portions 64, and connecting portions 66. The main body 62 may include an opening 68 (such as having a U-shape), and the extending portions 64 may extend from the corners of the main body 62. The connecting portions 66 are positioned on the extending portions 64 and having circular shape. In some embodiments, the material of the connecting element 60 may be non-magnetic permeable metal to prevent magnetic interference with other elements in the driving mechanism 1 (such as the first magnetic element 40 or the second magnetic element 50) from occurring. The substrate 106 may be partially disposed at the opening 68 of the connecting element 60 to prevent interference between the substrate 106 and the connecting element 60 from occurring when assembling the driving mechanism 1.

Figure 8:
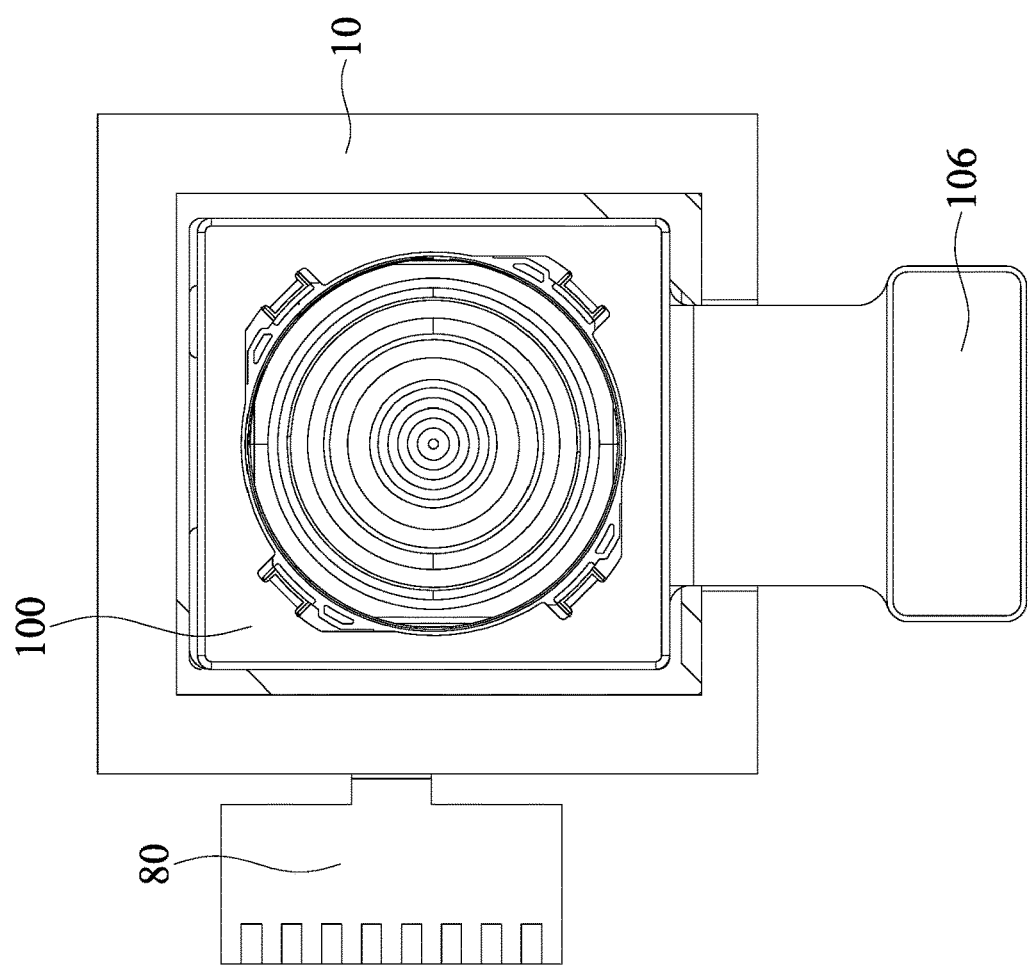
FIG. 8 is a top view of the driving mechanism in some embodiments of the present disclosure.

FIG. 8 is a top view of the driving mechanism 1. It should be noted that the circuit board 80 and the substrate 106 of the driving mechanism 1 extend from different sides of the driving mechanism 1. In other words, the circuit board 80 and the substrate 106 do not overlap each other when viewed along the optical axis O. For example, in FIG. 8, the circuit board 80 extends in −Y direction from the driving mechanism 1, and the substrate extends in X direction from the driving mechanism 1. Therefore, interference between the circuit board 80 and the substrate 106 may be prevented from occurring. Furthermore, the frame 10 may have non-magnetic materials (such as plastic) to prevent magnetic interference in the driving mechanism 1 from occurring.

Figure 9:
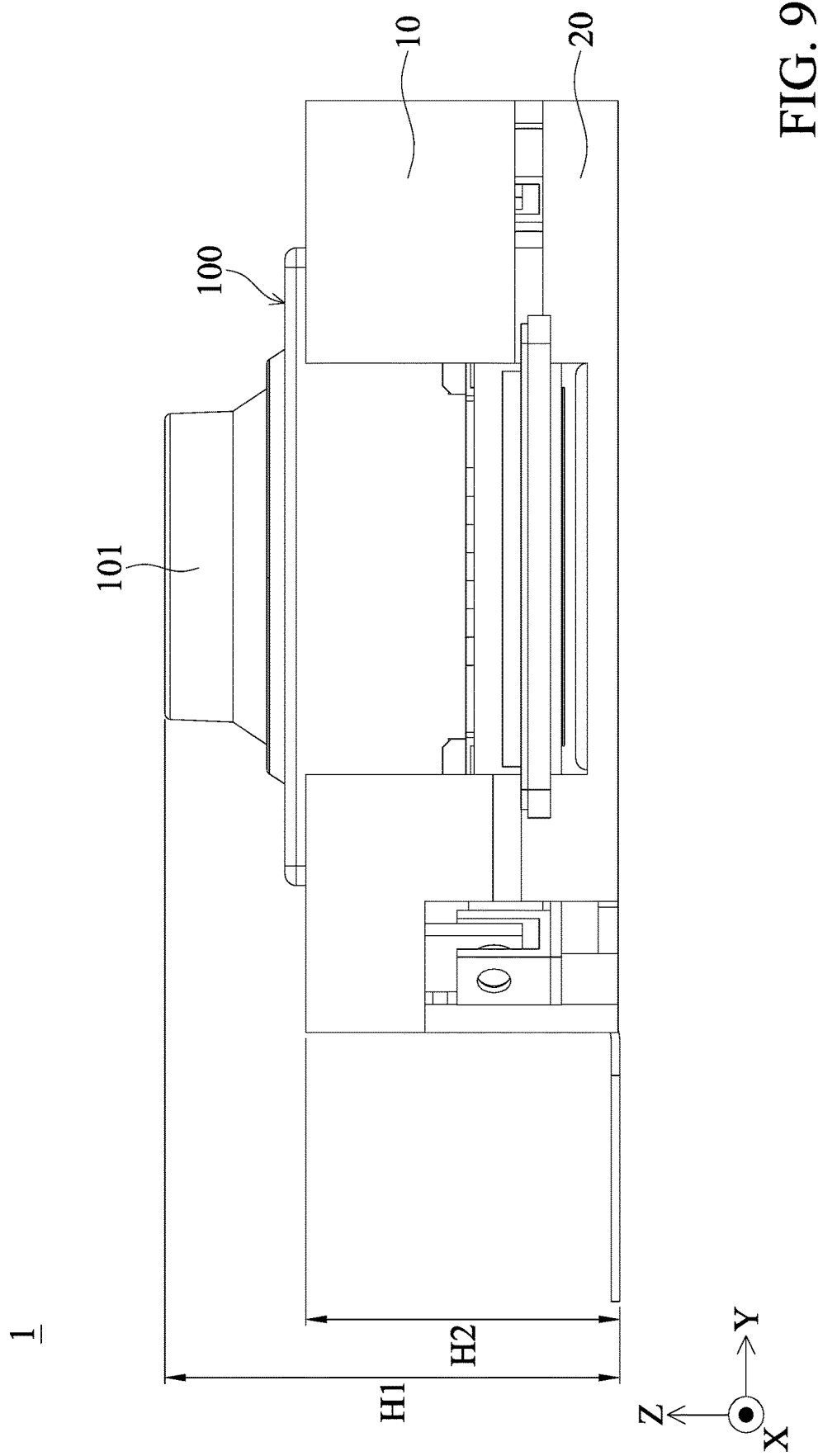
FIG. 9 is a side view of the driving mechanism in some embodiments of the present disclosure.

FIG. 9 is a side view of the driving mechanism 1. The total height (the distance between the bottom surface of the base 20 to the top of the optical element 101) is H1, the distance between the bottom surface of the base 20 to the top surface of the frame 10 is H2, and H1 is greater than H2. As a result, the size and the performance of the optical element 101 may be increased. Furthermore, additional elements (such as aperture or shutter) may be provided adjacent to a portion of the optical element 101 that is protruded from the frame 10 to further utilize the space.

Figure 10:
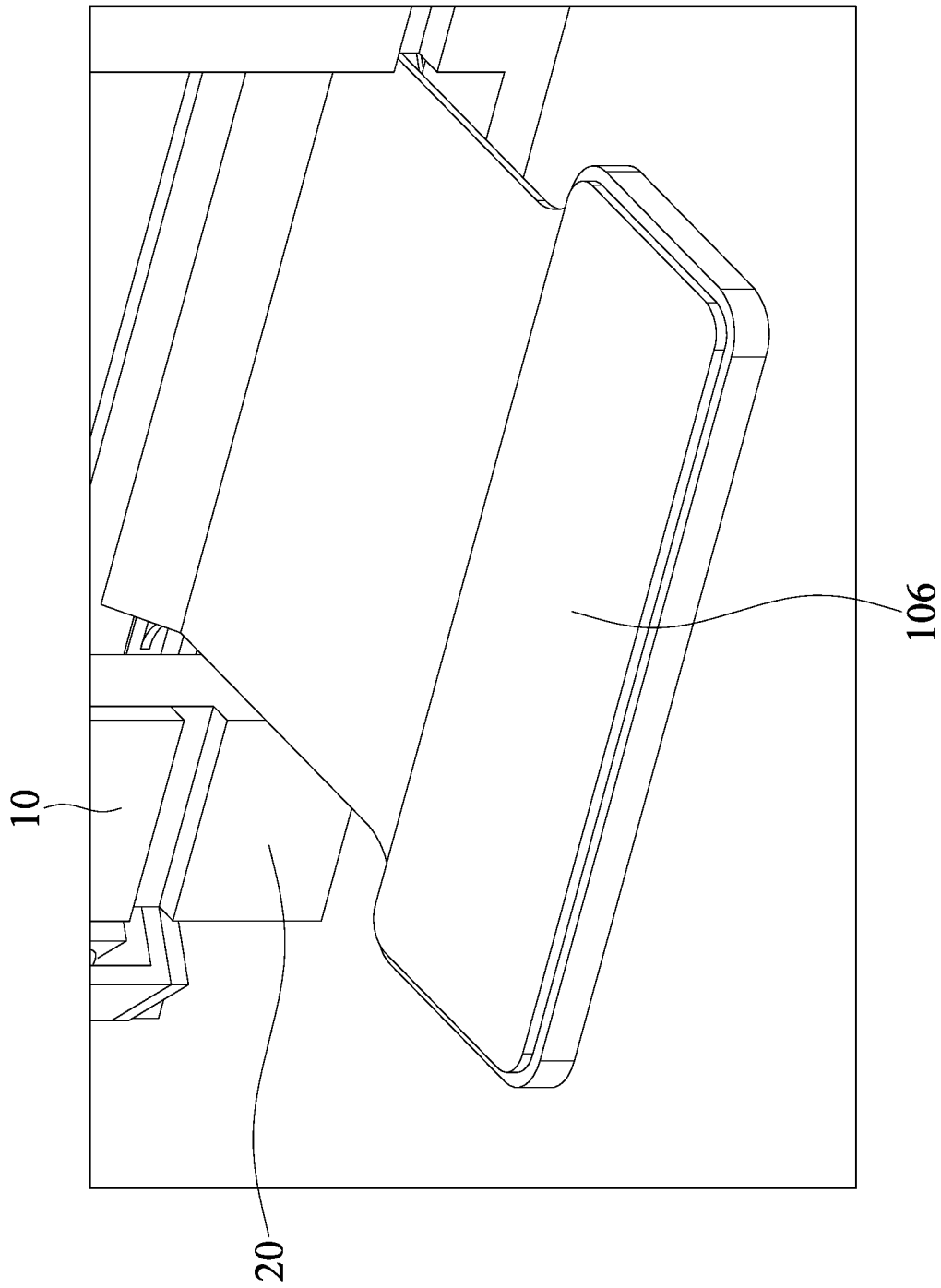
FIG. 10 is an enlarged view of a portion of the optical element in some embodiments of the present disclosure.

FIG. 10 is an enlarged view of a portion of the driving mechanism 1. The frame 10 and the base 20 may include an opening corresponding to the substrate 106, so the substrate 106 may be extended out from the opening.

Figure 11:
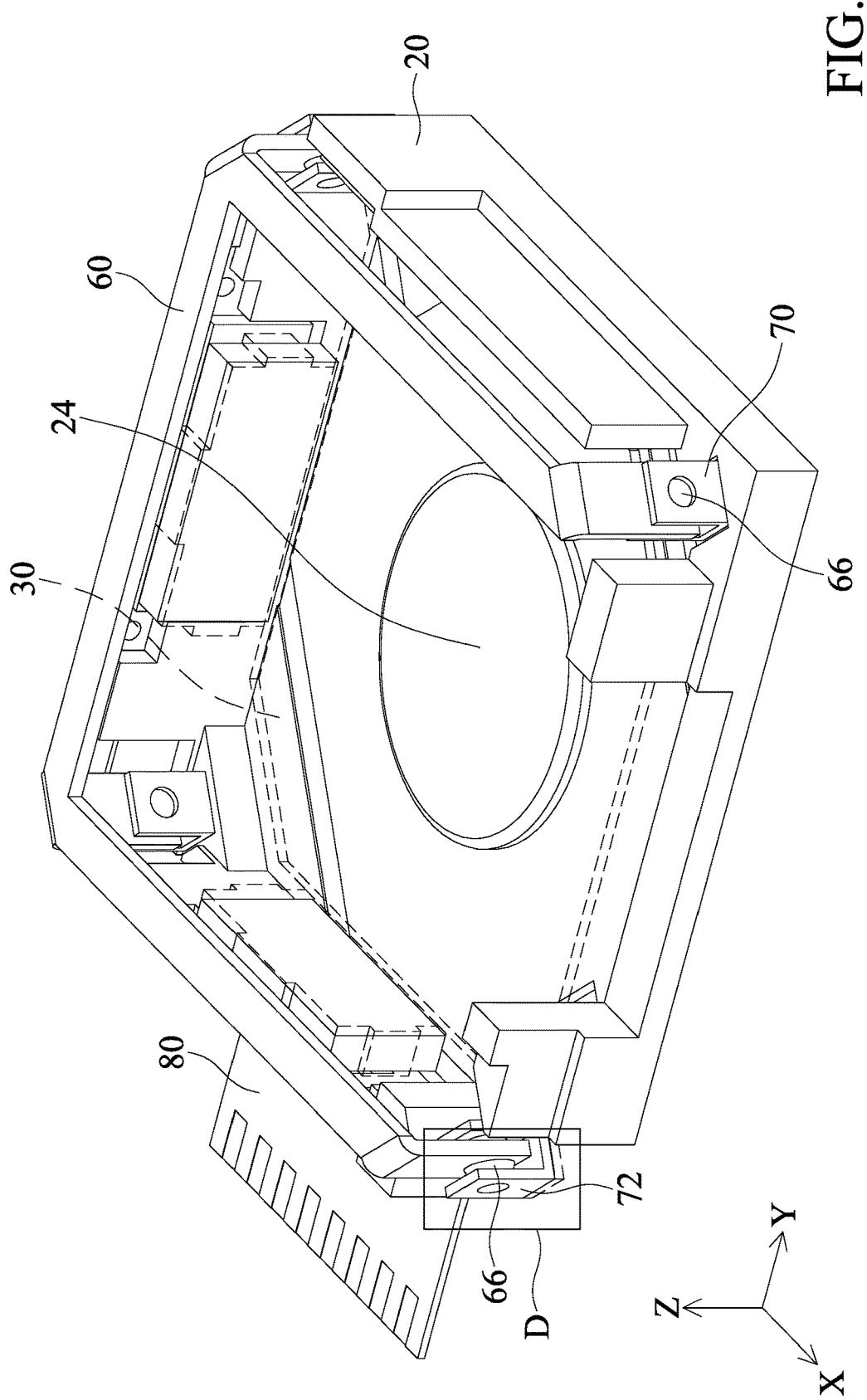
FIG. 11 is a schematic view of some elements of the driving mechanism in some embodiments of the present disclosure.
Figure 12:
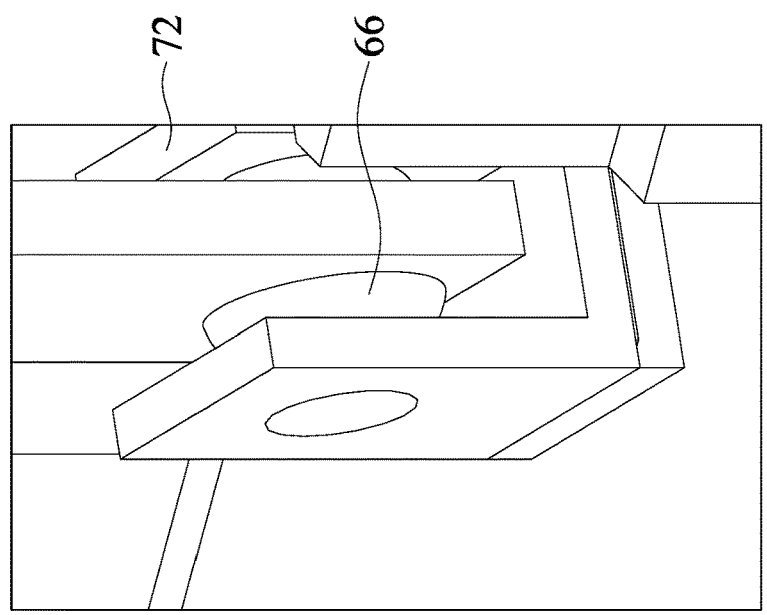
FIG. 12 is an enlarged view of the portion D in FIG. 11.

FIG. 11 is a schematic view of some elements of the driving mechanism 1, and FIG. 12 is an enlarged view of the portion D in FIG. 11. In FIG. 11, the stopping portion 24 of the base 20 extends along the Z direction to the moving portion M to limit the range of motion of the optical module 100 and the base 30 (illustrated as a dashed line in FIG. 11). It should be noted that a pair of connecting portions 66 of the connecting element 60 are disposed between the contact elements 70, and another pair of connecting portions are disposed in the contact elements 72. In other words, the contact elements 70 or 72 contact one of the connect portions 66. Furthermore, the optical axis O of the optical module 100 passes the center of the stopping portion 24, such as the circle center of the circular stopping portion 24 to balance the position limiting effect in various positions.

Figure 13:
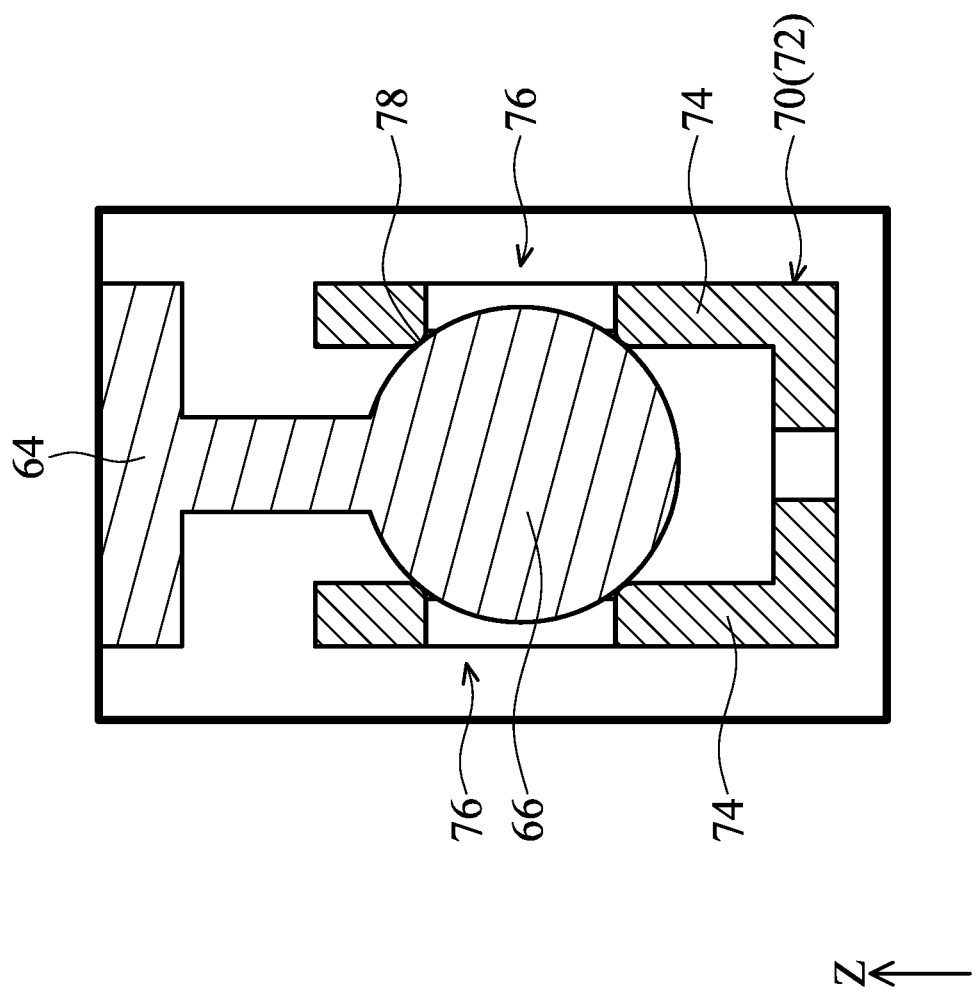
FIG. 13 is a schematic view when the connecting portion is connected to the contact element in some embodiments of the present disclosure.

FIG. 13 is a schematic view of the connecting portion 66 connecting to the contact element 70 (or the contact element 72). The contact element 70 or 72 may include a pair of contact portions 74 that are extending in the Z direction. An assembly portion 76 (such as a circular opening) may be positioned at each of the two contact portions 74. Two contact portions 74 may hold the connecting portion 66 from opposite sides of the connecting portion 66. In other words, the connecting portion 66 is positioned between the two contact portions 74. Furthermore, the circular connecting portion 66 may be partially disposed in the assembly portion 76. That is, one of the connecting portion 66 contacts to one of the connecting portion 74 when viewed along the optical axis O, so the connecting element 60 may be movably connected to the base 20 (a portion of the fixed portion F1) or the holder 30 (a portion of the movable portion M). In other words, a pair of connecting portion 66 of the contact elements 70 or 72 are directly and movably connected to either the movable portion M or the fixed portion F1, and another pair of connecting portions 66 are directly and movably connected to the other of the movable portion M or the fixed portion F1. In some embodiments, the corner 78 of the assembly portion 76 that contacts the connecting portion 66 may be an angle that is not a right angle (such as a radius angle or a chamfer angle) to prevent the connecting portion 66 from directly contacting a right angle, and the connecting portion 66 may be prevented from being damaged.

As a result, the connecting element 60 may be disposed in the driving mechanism 1 by friction contact rather than being suspended by a spring in the driving mechanism, to rotate relative to a single axis or multiple axes. As a result, the driving mechanism 1 may be operated by overcoming the friction between the connecting elements 60 to the base 20 and the holder 30, so required power may be reduced. Furthermore, according to this design, the optical element 100 may rotate in a greater angle (such as ±2 degrees to ±10 degrees) by the driving mechanism 1. Moreover, the reliability of the driving mechanism 1 may be enhanced by the connecting element 60 with enhanced strength, and the optical element 100 may be prevented from sinking under its own weight.

Figure 14:
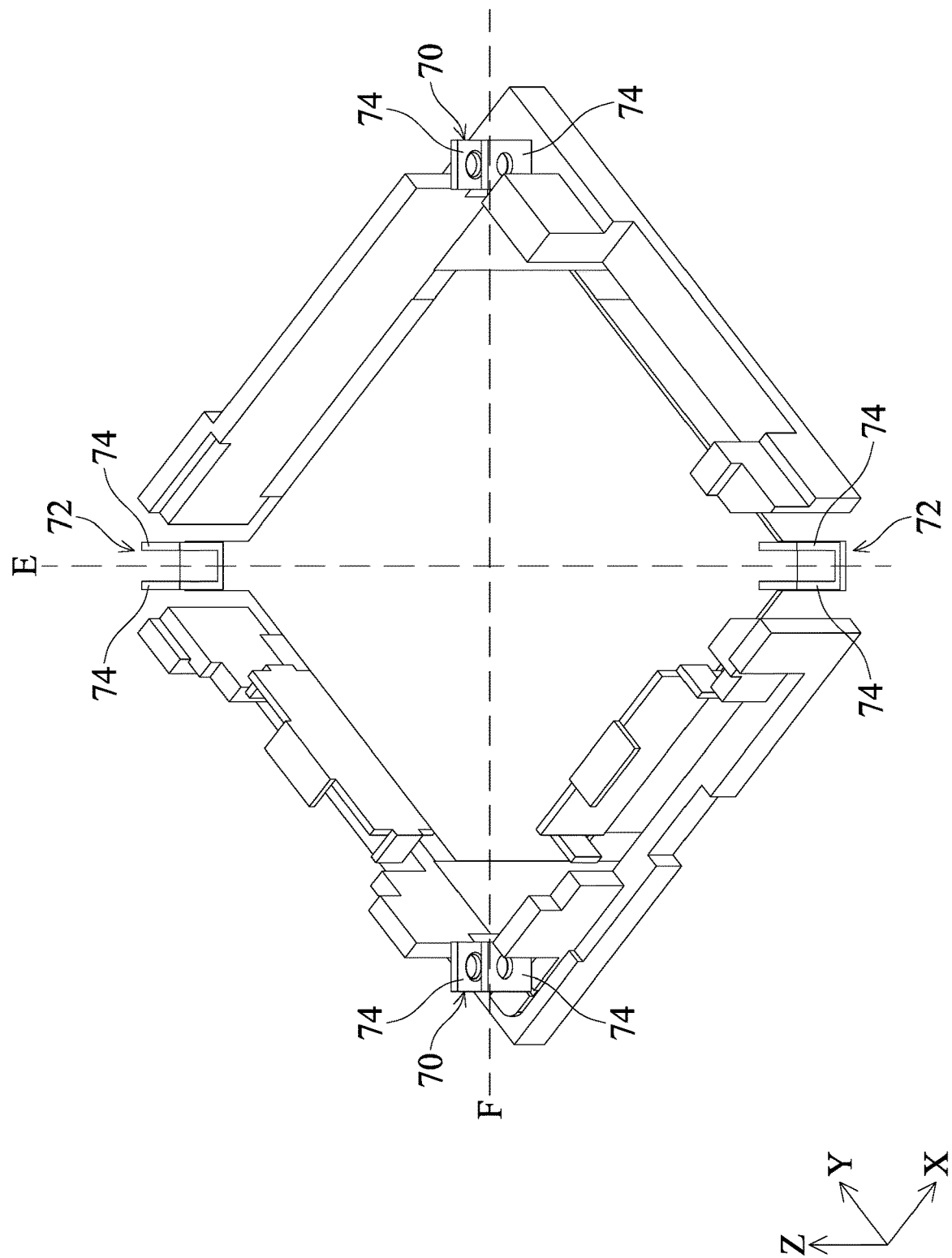
FIG. 14 is a schematic view of the base and the holder in some embodiments of the present disclosure.

FIG. 14 is a schematic view of the base 20 and the holder 30. In some embodiments, the contact portions 74 that are affixed to a single element (such as the base 20 or the holder 30) may have the same axis, and are arranged in a horizontal direction. For example, the two contact portions 74 of one contact element 70 on the base 20 are arranged in the X direction, and the two contact portion 74 of one contact element 72 on the holder 30 are arranged in the Y direction. The connecting line F between the two contact elements 70 that are affixed on the base 20 and the connecting line E between the two contact elements 72 that are affixed on the holder 30 may be substantially perpendicular to each other. In other words, the connecting element includes a pair of first connecting portions (the connecting portions 66 that are connected to the contact element 70) and a pair of second connecting portions (the connecting portions 66 that are connected to the contact element 72), the first connecting portions are directly connected to either the movable portion M or the fixed portion F1, the second connecting portions are directly connected to the other of the movable portion M or the fixed portion F1, and the connecting line between the first connecting portions is perpendicular to the connecting line between the second connecting portions.

Figure 15:
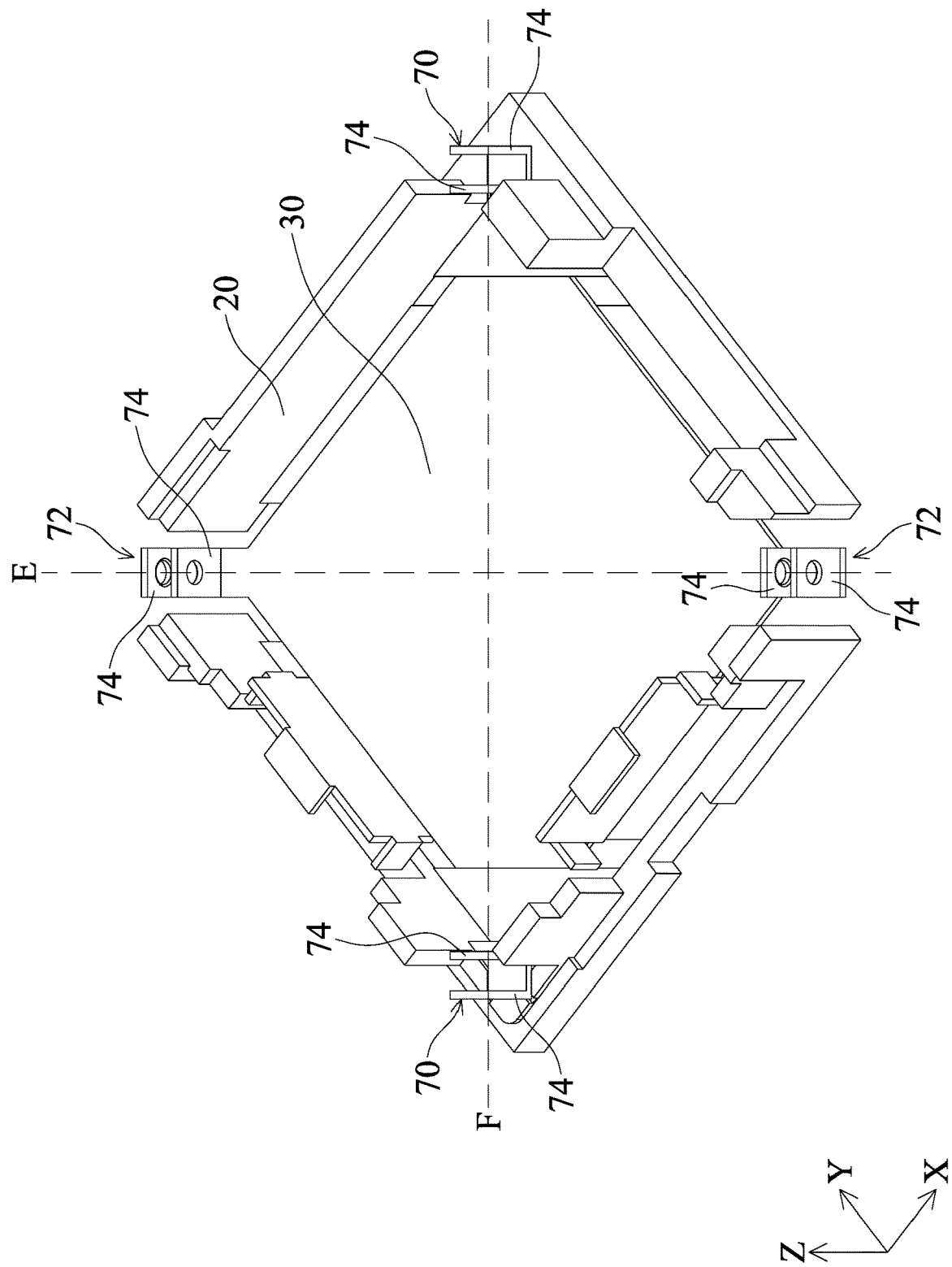
FIG. 15 is a schematic view of the base and the holder in other embodiments of the present disclosure.

The stability of the driving mechanism 1 may be enhanced by this design. However, the present disclosure is not limited thereto. For example, FIG. 15 is a schematic view of the base 20 and the holder 30 in other embodiments of the present disclosure. In FIG. 15, the contact portions 74 of the contact element 70 are arranged in the connection line F, and the contact portions 74 of the contact element 72 are arranged in the connection line E. As a result, the connecting portions 66 of the connecting element 60 may also be affixed, and interference between the contact elements 70 or the contact elements 72 to other elements may be prevented from occurring.

Figure 16:
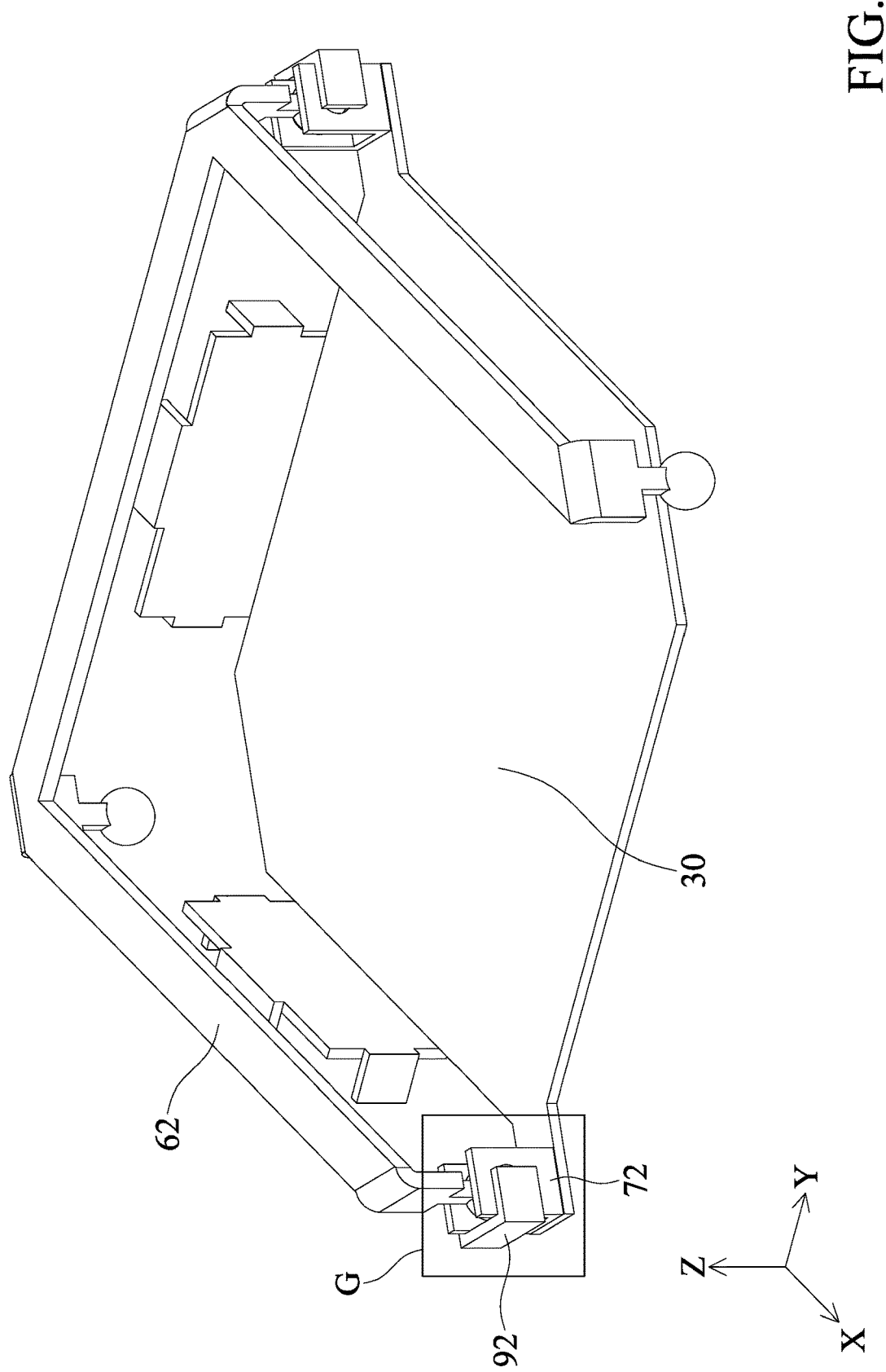
FIG. 16 is a schematic view of some elements of the driving mechanism in some embodiments of the present disclosure.
Figure 17:
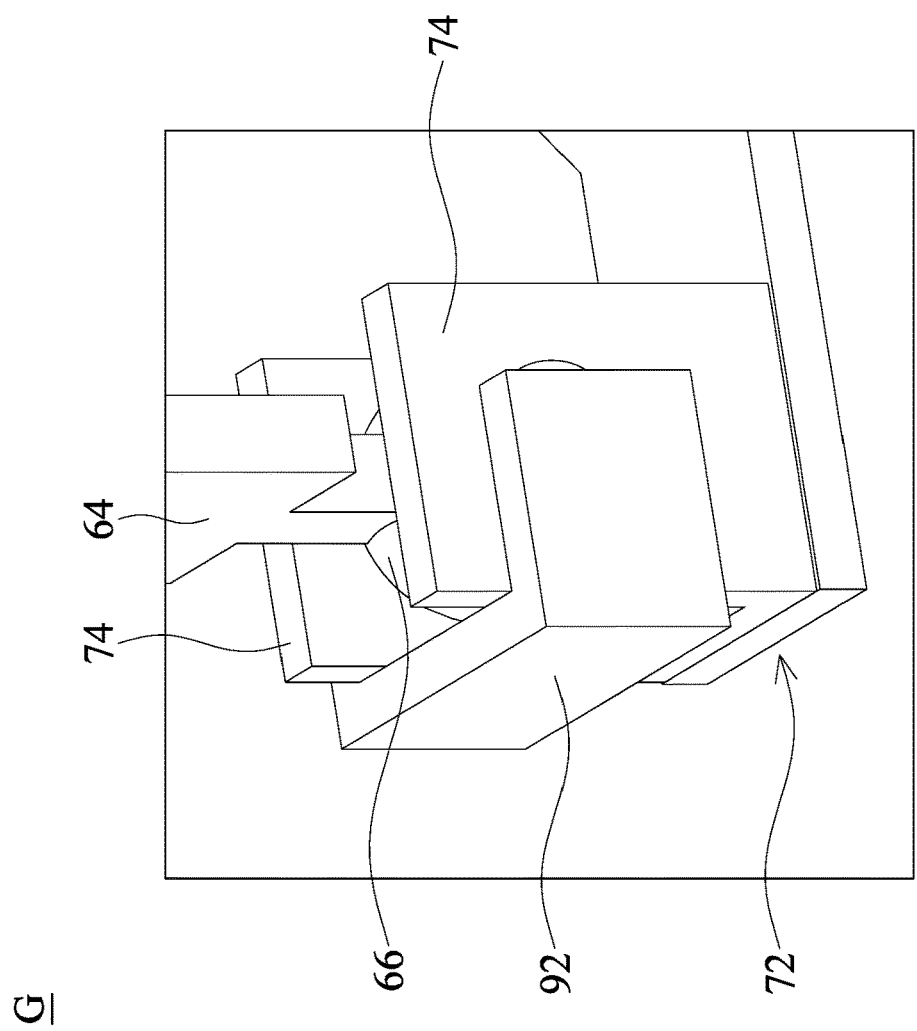
FIG. 17 is an enlarged view of the portion G in FIG. 16.

FIG. 16 is a schematic view of some elements of the driving mechanism 1 in some embodiments, and FIG. 17 is an enlarged view of the portion G in FIG. 16. In some embodiments, the driving mechanism 1 may include a strengthening element 92 that is fit tightly to the contact portion 74 to apply a force from the contact portion 74 toward the connecting portion 66, so the connecting element 60 may be prevented from detaching from the holder 30. The strengthening element 92 may be a U-shaped metal piece (such as an iron piece).

Figure 18:
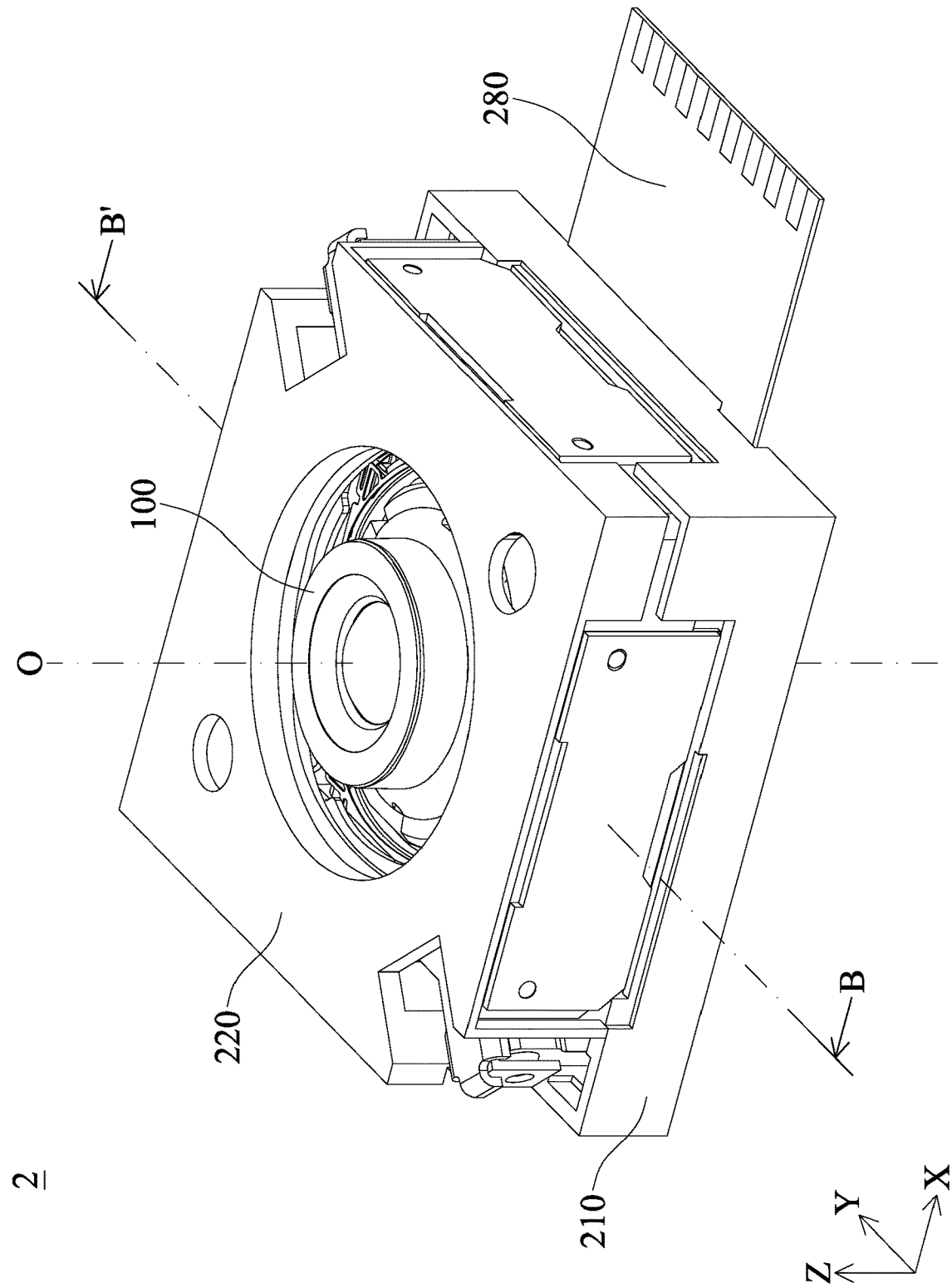
FIG. 18 is a schematic view of a driving mechanism in some embodiments of the present disclosure.
Figure 19:
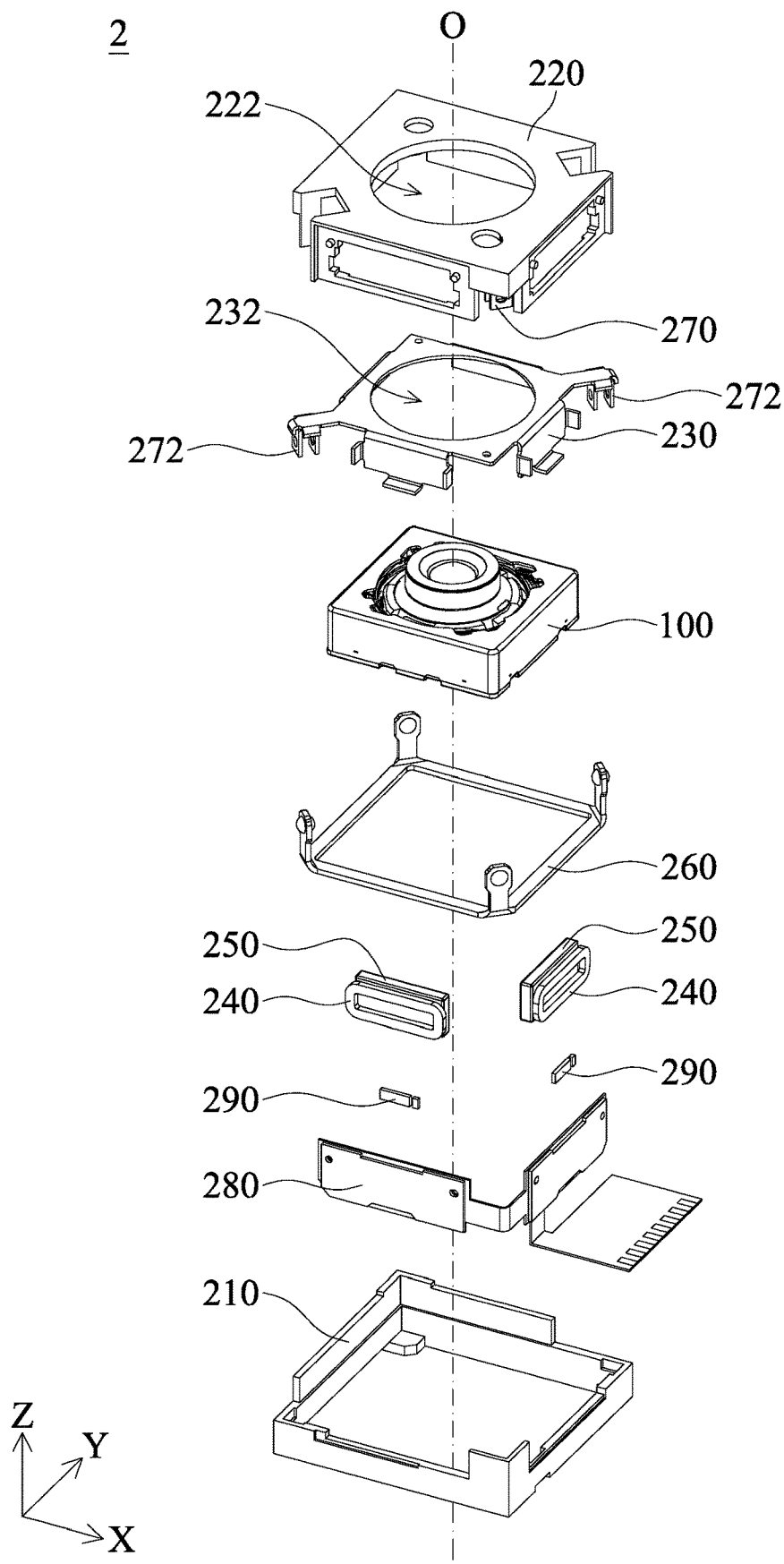
FIG. 19 is an exploded view of some embodiments of the present disclosure.
Figure 20:
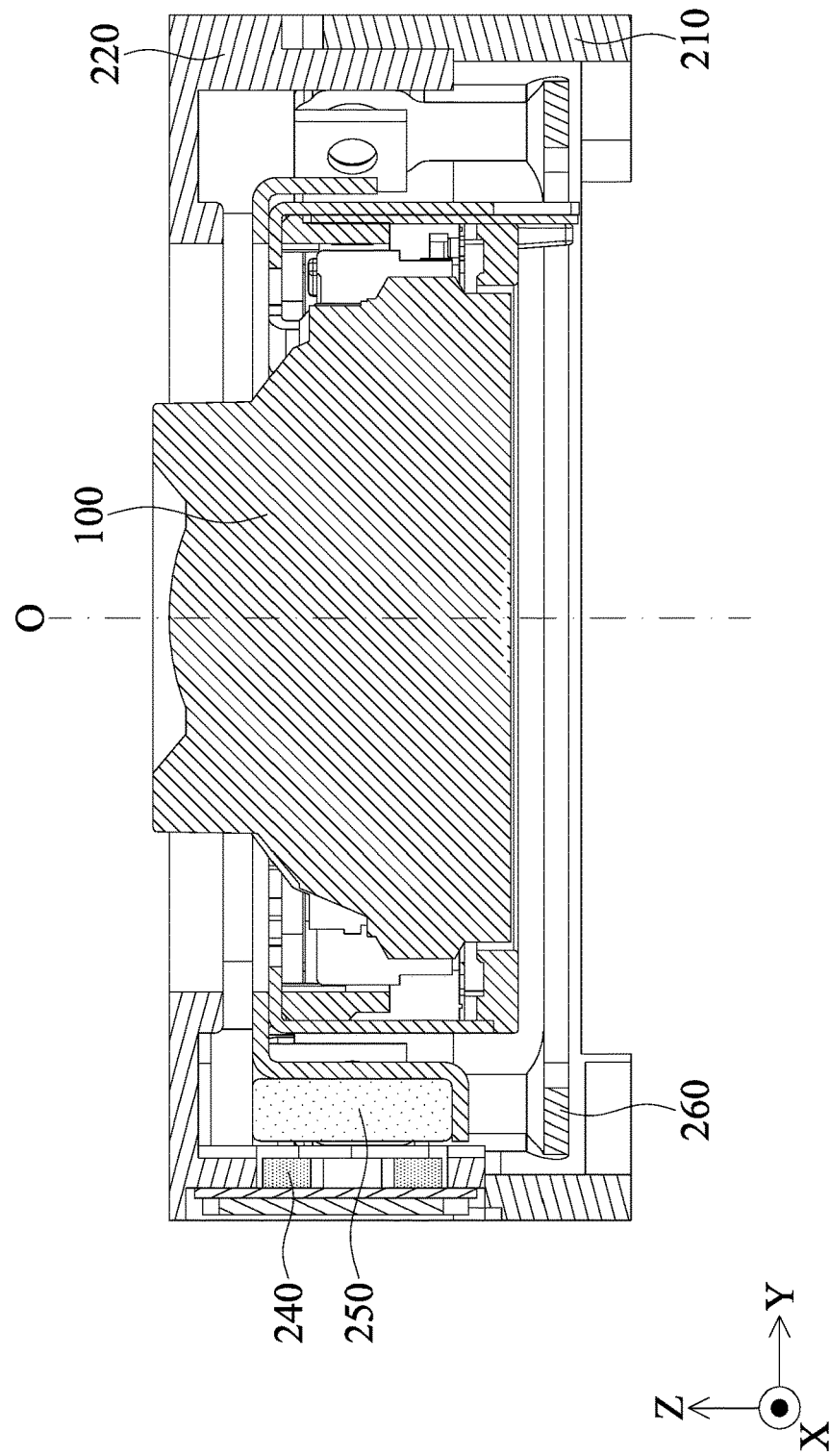
FIG. 20 is a cross-sectional view illustrated along line B-B' in FIG. 18.
Figure 21:
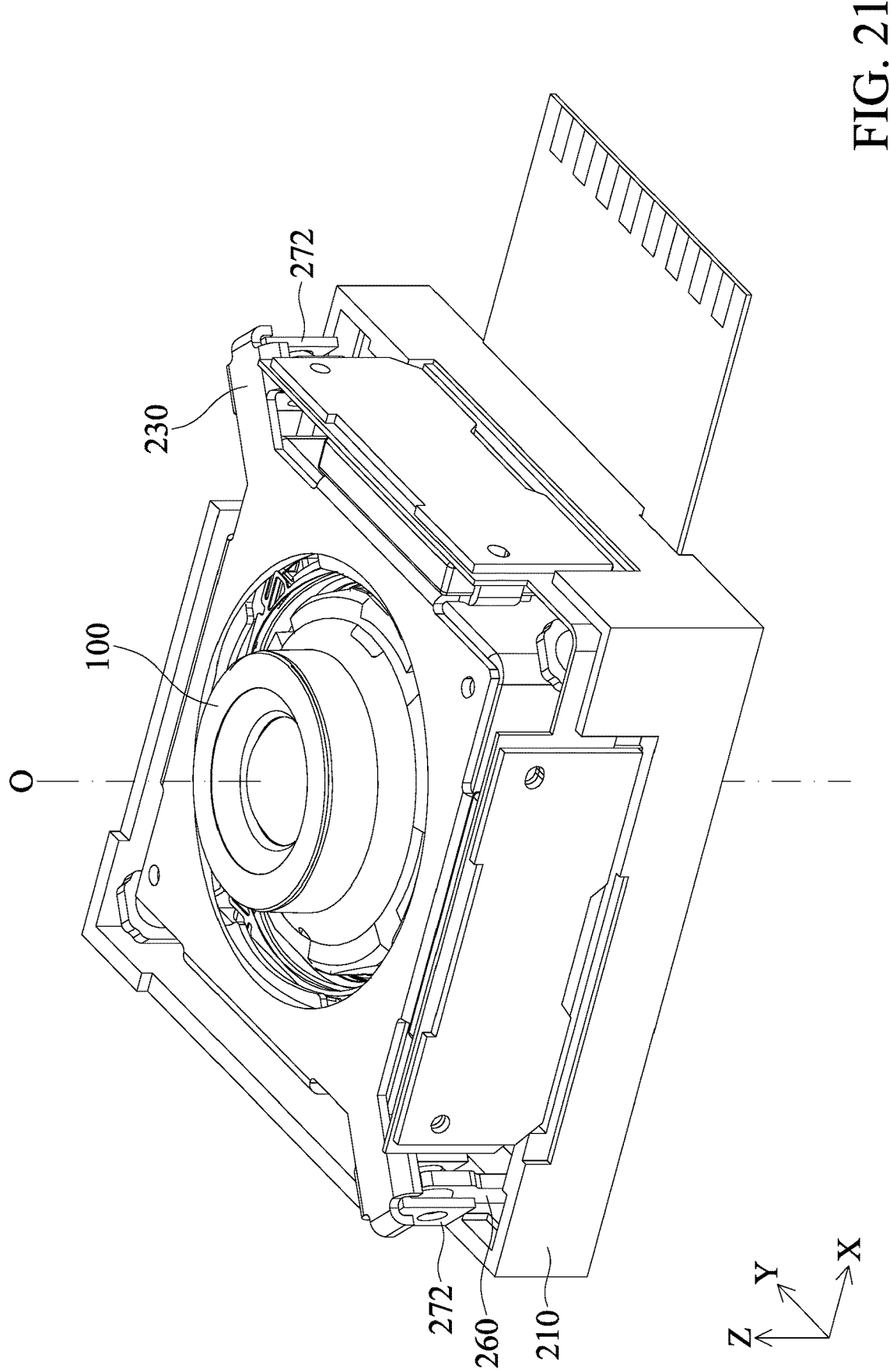
FIG. 21 is a schematic view of some elements of the driving mechanism in some embodiments of the present disclosure.

In previous embodiments, the holder 30 is disposed at the bottom of the optical module 100 (the light exit side of the optical module 100). However, the present disclosure is not limited thereto. FIG. 18 is a schematic view of the driving mechanism 2 in some embodiments of the present disclosure, FIG. 19 is an exploded view of the driving mechanism 2, FIG. 20 is a cross-sectional view of the driving mechanism 2 illustrated along the line B-B' in FIG. 18, and FIG. 21 is a schematic view of some elements of the driving mechanism 2.

The driving mechanism 2 may driving the optical module 100, and includes a frame 210, a base 220, a holder 230, a first magnetic element 240, a second magnetic element 250, a connecting element 260, contact elements 270, contact elements 272, a circuit board 280, and a sensor 290. The functions of the elements are similar to the frame 10, the base 20, the holder 30, the first magnetic element 40, the second magnetic element 50, the connecting element 60, the contact element 70, the contact element 72, the circuit board 80, and the position sensor 90 of the driving mechanism 1, and are not repeated.

In the driving mechanism 2, the holder 230 is disposed at the light incident side of the optical module 100. In other words, the optical element 101 of the optical module 100 is disposed between the substrate 106 and the holder 230, or the optical module 100 is disposed between the holder 230 and the base 220. Furthermore, a base opening 222 and a holder opening 232 may respectively position on the base 220 and the holder 230 to allow light to pass through the base opening 222 and the holder opening 232 to reach the optical module 100. The space adjacent to the optical element 101 may be further utilized by providing the holder 230 at the light incident side, so the height of the driving mechanism 2 in the Z direction may be reduced to achieve miniaturization.

Figure 22:
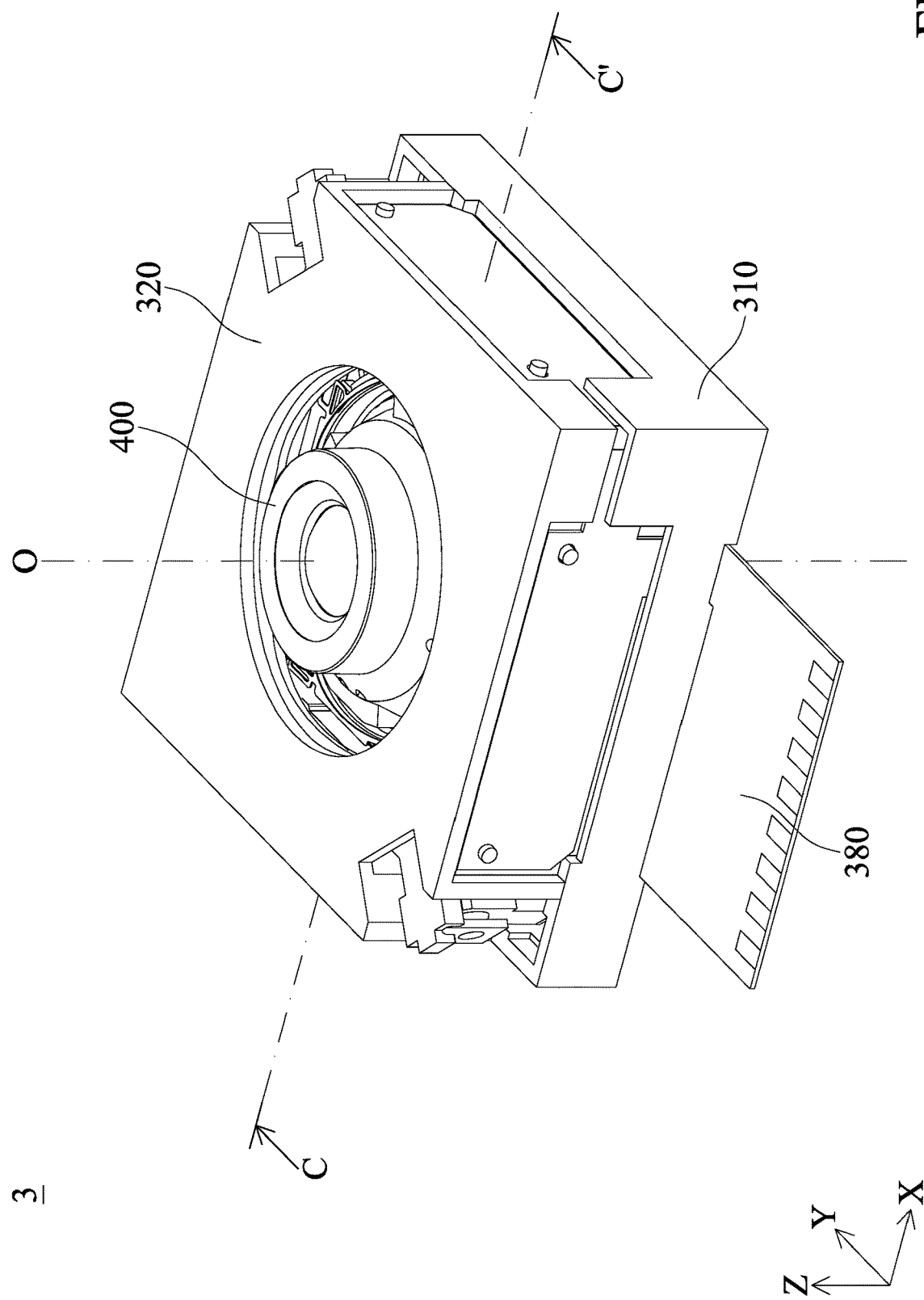
FIG. 22 is a perspective view of a driving mechanism in some embodiments of the present disclosure.
Figure 23:
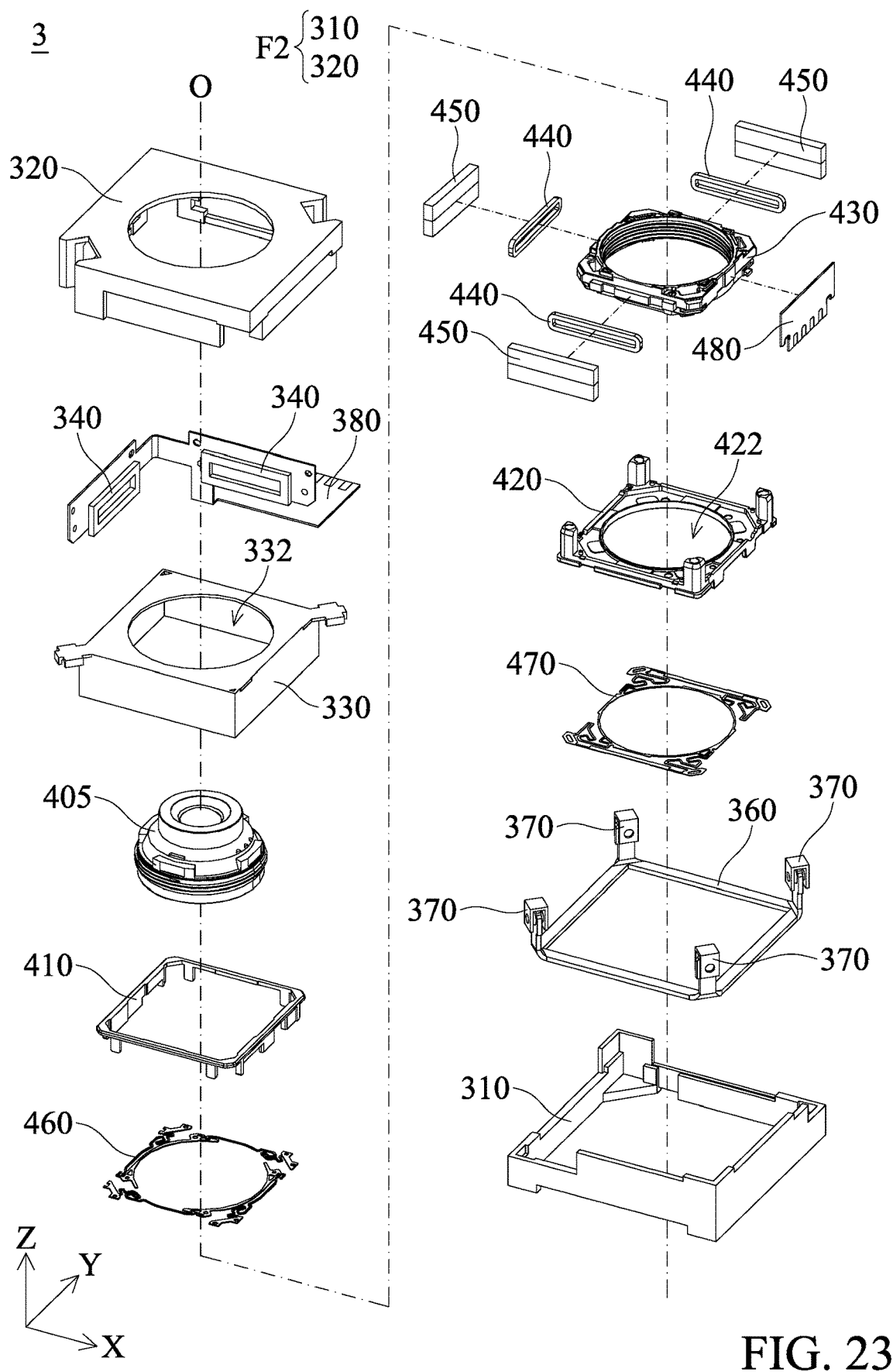
FIG. 23 is an exploded view of some embodiments of the present disclosure.
Figure 24:
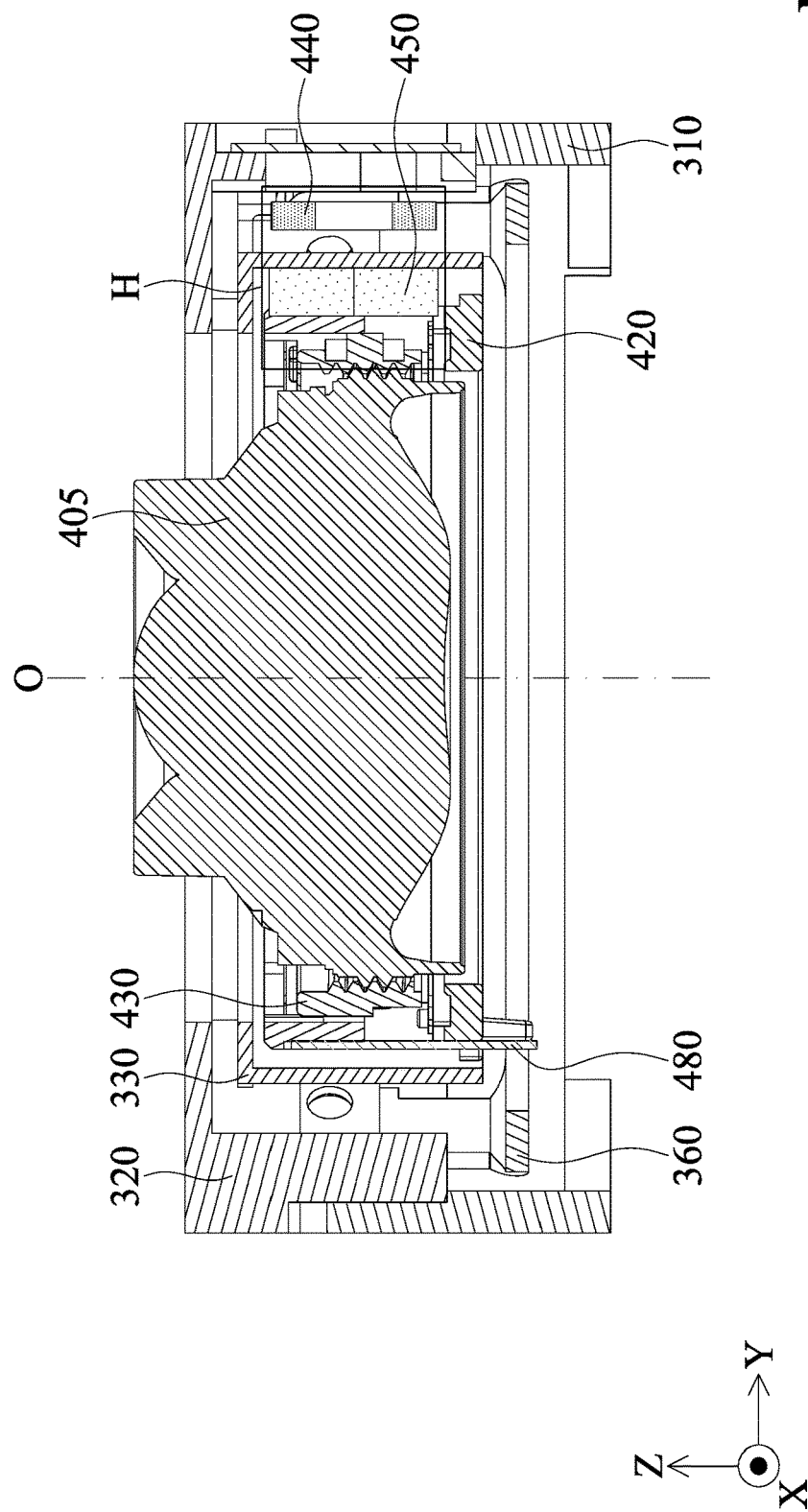
FIG. 24 is a cross-sectional view illustrated along line C-C' in FIG. 23.
Figure 25:
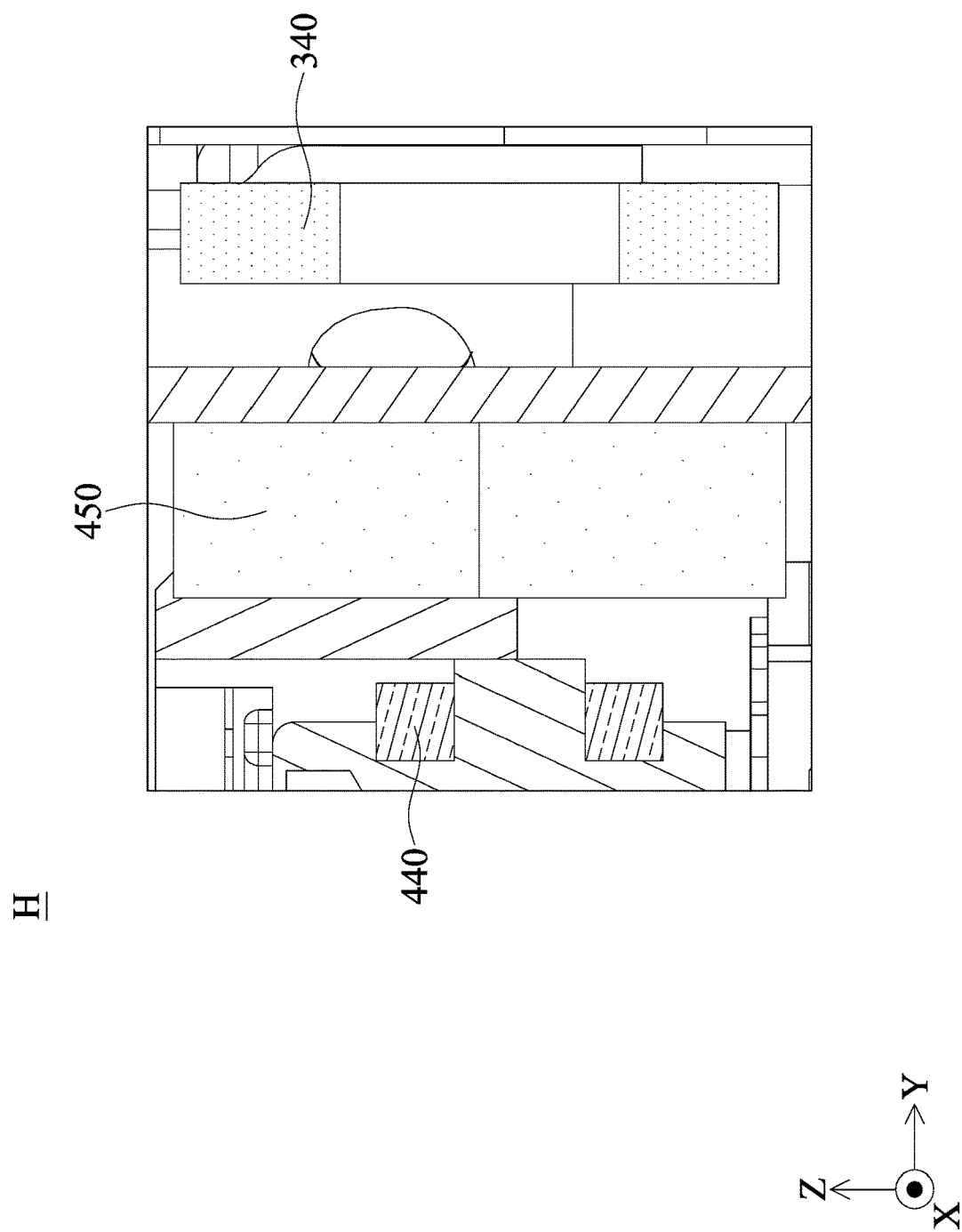
FIG. 25 is an enlarged view of the portion H in FIG. 24.

In previous embodiments, the optical module 100 and the driving mechanism 1 or 2 have their own magnetic elements (such as magnets and coils). However, the present disclosure is not limited thereto. For example, FIG. 22 is a perspective view of the driving mechanism 3 in some embodiments of the present disclosure, FIG. 23 is a exploded view of the driving mechanism 3, FIG. 24 is a cross-sectional view of the driving mechanism 3 illustrated along the line C-C' in FIG. 22, and FIG. 25 is an enlarged view of the portion H in FIG. 24.

The driving mechanism 3 may driving the optical module 400, and includes a frame 310, a base 320, a holder 330, a first magnetic element 340, a second magnetic element 350, a connecting element 360, contact elements 370, contact elements 372, and a circuit board 380. The functions of the elements are similar to the frame 10, the base 20, the holder 30, the first magnetic element 40, the second magnetic element 50, the connecting element 60, the contact element 70, the contact element 72, and the circuit board 80 of the driving mechanism 1, and are not repeated. The frame 310 and the base 320 may be called as a fixed portion F2.

The optical module 400 mainly includes an optical element 405, a frame 410, a base 420, a holder 430, a plurality of third magnetic elements 440, a plurality of fourth magnetic elements 450, a first resilient element 460, a second resilient element 470, and a substrate 480. The optical module 400 may move the optical element 405 to achieve auto focus (AF) or optical image stabilization (OIS).

The holder 330 and the base 420 may be combined to form the outer case of the optical module 400. It should be noted that a holder opening 332 and a base opening 422 may be respectively formed on the holder 330 and the base 420, the center of the holder opening 332 is corresponding to the optical axis O of the optical element 405, and the base opening 422 is corresponding to an image sensor (not shown) disposed outside the driving mechanism 3. As a result, the optical element 405 may be focused with the image sensor along the optical axis O.

The holder 430 has a through hole, wherein the optical element 405 may be affixed in the through hole, and the third magnetic element 440 may be disposed on the external surface of the holder 430. The fourth magnetic element 450 may be affixed on the frame 410 or may be movable relative to the frame 410. The third magnetic element 440 may be, for example, a driving coil, and the fourth magnetic element 450 may be, for example, a driving magnet. It should be noted that the holder 430 may be moved along the optical axis O relative to the frame 410 by the interaction between the third magnetic element 440 and the fourth magnetic element 450 to achieve fast focus.

In this embodiment, the holder 430 and the optical element 410 disposed in the holder 430 are movably disposed in the frame 410. More specifically, the holder 430 is suspended in the frame 410 by the first resilient element 460 and the second resilient element 470 made of a metal material (FIG. 24). When a current is supplied to the third magnetic element 440, the third magnetic element 440 can act with the magnetic field of the fourth magnetic element 450 to generate an electromagnetic force to move the holder 430 and the optical element 405 along the optical axis O direction relative to the frame 410 to achieve auto focusing.

Furthermore, the substrate 480 may be, for example, a flexible printed circuit (FPC), which may be affixed on the base 420 by adhering. In this embodiment, the substrate 480 is electrically connected to other electronic elements disposed in the optical module 400 or outside the optical module 400. For example, the substrate 480 may provide electronic signal to the third magnetic element 440 through the first resilient element 460 or the second resilient element 470 to control the movement of the holder 430 along the X, Y or Z axes.

It should be noted that the third magnetic element 440 and the fourth magnetic element 450 are disposed at positions that correspond to the first magnetic elements 340 (in other words, they are disposed on the same side), and only one magnet (such as the fourth magnetic element 450) is positioned between the first magnetic element 340 and the third magnetic element 440. As a result, two coils (such as the first magnetic element 340 and the third magnetic element 440) may share one magnet (such as the fourth magnetic element 450), and the number of magnets in the driving mechanism 3 may be reduced to achieve miniaturization.

Figure 26:
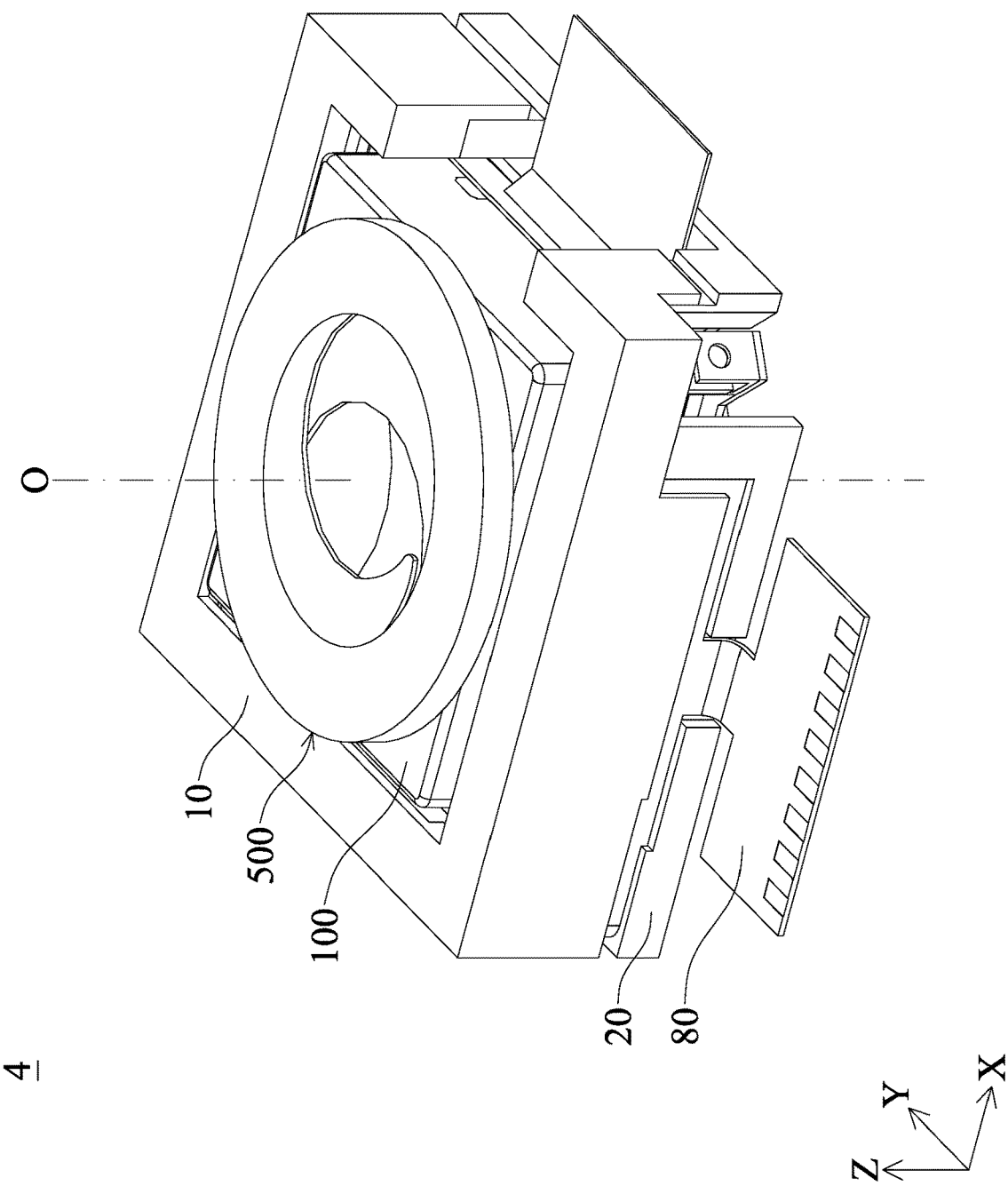
FIG. 26 is a perspective view of a driving mechanism in some embodiments of the present disclosure.
Figure 27:
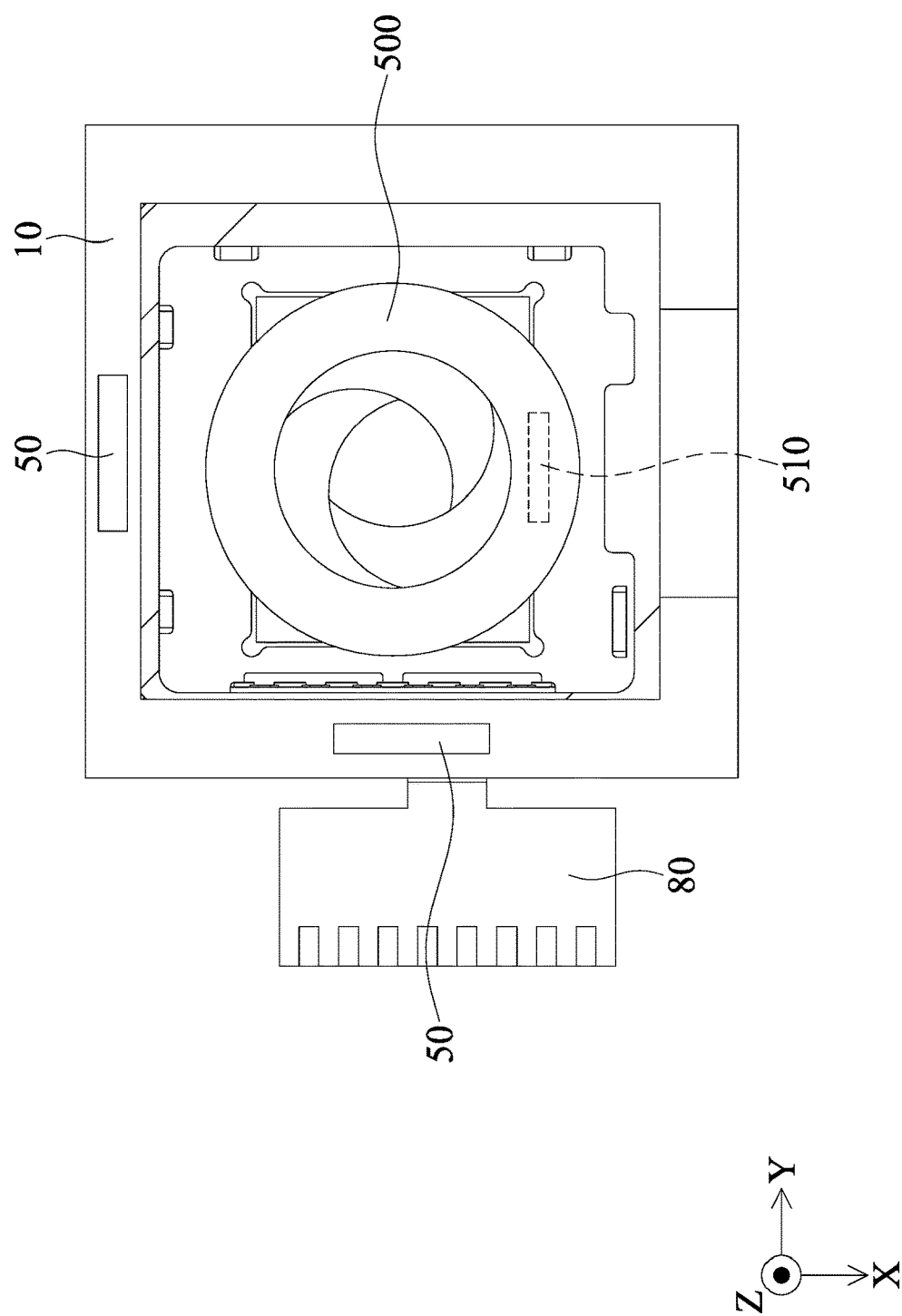
FIG. 27 is a top view of a driving mechanism in some embodiments of the present disclosure.

Furthermore, the driving mechanisms in the present disclosure may be used with an aperture module to enhance the performance. For example, FIG. 26 is a perspective view of a driving mechanism 4 in some embodiments of the present disclosure, and FIG. 27 is a top view of the driving mechanism 4. The driving mechanism 4 may have a similar structure to the driving mechanism 1, 2, or 3, and the difference is that the driving mechanism 4 further includes an aperture module 500 at the light incident side of an optical element (not shown). The aperture module 500 may be an element disposed on an image capturing device for controlling the aperture size of an optical element (such as a lens), so the depth of field and the quality of the image may be controlled. Furthermore, the amount of light entering the optical element may be controlled by the aperture module 500 and a shutter. For an optical element that has been produced, the diameter of the optical element cannot be changed, but the light flux of the optical element may be controlled by adding a polygon or circular aperture on the optical element, wherein the area of the aperture is adjustable. Moreover, the aperture module 500 may adjust the light intensity from every direction when the optical element is rotating, to make the received image clearer.

In some embodiments, the aperture module 500 includes a sensor 510 to detect the position of the blades of the aperture module 500. The sensor 510 may be a Hall sensor, a magnetoresistance effect sensor (MR sensor), a giant magnetoresistance effect sensor (GMR Sensor), a tunneling magnetoresistance effect sensor (TMR Sensor), or a fluxgate sensor, but is not limited thereto. The sensor 510 and the second magnetic element 50 (such as a magnet) may be disposed on different sides to prevent magnetic interference.

In summary, a driving mechanism is provided for drive the optical module. The driving mechanism may be operated by overcoming friction, so required power may be reduced. Moreover, the optical element may rotate in a relative large angle. Furthermore, the reliability of the driving mechanism may be enhanced by a connecting element with enhanced strength, and the optical element may be prevented from sinking under its own weight.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A driving mechanism, comprising:
 a fixed portion;
 a movable portion that is movable relative to the fixed portion, and is used for holding an optical module having an optical axis, wherein the optical module comprises a substrate;
 a driving assembly for driving the movable portion to move relative to the fixed portion;
 a connecting element movably connected to the fixed portion and the movable portion; and
 a circuit board, wherein the substrate and the circuit board do not overlap each other when viewed along the optical axis.

2. The driving mechanism as claimed in claim 1, wherein the connecting element comprises a pair of connecting portions directly and movably connected to either the movable portion or the fixed portion.

3. The driving mechanism as claimed in claim 2, wherein the connecting element further comprises another pair of connecting portions directly and movably connected to the other of the movable portion or the fixed portion.

4. The driving mechanism as claimed in claim 2, wherein the movable portion comprises a holder, and the holder comprises a contact element contacting one of the connecting portions.

5. The driving mechanism as claimed in claim 4, wherein the contact element comprises two contact portions, and one of the connecting portions is positioned between the contact portions.

6. The driving mechanism as claimed in claim 5, wherein each of the contact portions further comprises an assembly portion, and the connecting portion is partially positioned in the assembly portion.

7. The driving mechanism as claimed in claim 6, wherein a portion of the assembly portion that contacts the contact portion is not a right angle.

8. The driving mechanism as claimed in claim 5, wherein the connecting portion overlaps one of the contact portions when viewed along the optical axis.

9. A driving mechanism, comprising:
 a fixed portion;
 a movable portion that is movable relative to the fixed portion, and is used for holding an optical module having an optical axis, wherein the movable portion comprises a holder, and the holder comprises a contact element contacting one of the connecting portions, wherein the contact element comprises two contact portions, and one of the connecting portions is positioned between the contact portions;
 a driving assembly for driving the movable portion to move relative to the fixed portion;
 a connecting element movably connected to the fixed portion and the movable portion, wherein the connecting element comprises a pair of connecting portions directly and movably connected to either the movable portion or the fixed portion; and
 a strengthening element that is fit tightly to the contact portions to apply a force to the contact portions, and a direction of force is from the contact portions to the connecting portion.

10. The driving mechanism as claimed in claim 4, wherein the fixed portion comprises a base, the movable portion comprises a holder, and the holder is disposed between the base and the optical module.

11. The driving mechanism as claimed in claim 4, wherein the fixed portion comprises a base, the movable portion comprises a holder, and the optical module is disposed between the holder and the base.

12. The driving mechanism as claimed in claim 3, wherein the movable portion comprises a holder, the holder comprises a contact element contacting one of the connecting portions.

13. The driving mechanism as claimed in claim 1, wherein the fixed portion comprises a frame surrounding the movable portion, and the optical module does not overlap the frame when viewed along the optical axis.

14. The driving mechanism as claimed in claim 1, wherein the fixed portion comprises a base, the base comprises a stopping portion extending to the movable portion, and the optical axis passes the center of the stopping portion.

15. The driving mechanism as claimed in claim 1, wherein no magnet is positioned between the optical module and the fixed portion.

16. The driving mechanism as claimed in claim 1, wherein the optical module further comprises a sensor, the optical module is substantially rectangular, and the driving assembly and the sensor are positioned at different sides of the optical module.

17. The driving mechanism as claimed in claim 1, wherein the optical module further comprises a sensor, the optical module is substantially rectangular, and the driving assembly and the sensor are positioned at a sameside of the optical module.

18. The driving mechanism as claimed in claim 1,
 wherein the connecting element has an opening, and the optical module further comprises a circuit board partially disposed in the opening when viewed along the optical axis.

19. The driving mechanism as claimed in claim 1, wherein the connecting element comprises:
 a pair of first connecting portions directly connected to either the movable portion or the fixed portion; and
 a pair of second connecting portions directly connected to the other of the movable portion or the fixed portion, wherein a connection line of the pair of first connecting portions is perpendicular to a connection line of the pair of second connecting portions.

20. A driving mechanism, comprising:
 a fixed portion;
 a movable portion that is movable relative to the fixed portion, and is used for holding an optical module having an optical axis;
 a driving assembly for driving the movable portion to move relative to the fixed portion; and
 a connecting element movably connected to the fixed portion and the movable portion, wherein the connecting element comprises:
 a main body having a U-shape;
 extend portions extending from the main body; and
 connecting portions positioned on the extending portions.

* * * * *